United States Patent
Tsuchiya

(10) Patent No.: US 11,583,127 B2
(45) Date of Patent: Feb. 21, 2023

(54) RICE GEL PRODUCTION SYSTEM AND RICE GEL PRODUCTION METHOD

(71) Applicant: Yanmar Co., Ltd., Osaka (JP)

(72) Inventor: Kuniyasu Tsuchiya, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 507 days.

(21) Appl. No.: 16/348,430

(22) PCT Filed: Oct. 10, 2017

(86) PCT No.: PCT/JP2017/036662
§ 371 (c)(1),
(2) Date: May 8, 2019

(87) PCT Pub. No.: WO2018/088092
PCT Pub. Date: May 17, 2018

(65) Prior Publication Data
US 2019/0269271 A1    Sep. 5, 2019

(30) Foreign Application Priority Data

Nov. 10, 2016 (JP) .............................. JP2016-219760
Jun. 30, 2017 (JP) .............................. JP2017-128660

(51) Int. Cl.
*A47J 27/00* (2006.01)
*A23P 10/20* (2016.01)
(Continued)

(52) U.S. Cl.
CPC .............. *A47J 27/002* (2013.01); *A23L 7/10* (2016.08); *A23P 10/20* (2016.08); *A47J 27/00* (2013.01);
(Continued)

(58) Field of Classification Search
CPC . A23L 7/10; A23L 7/122; A23L 7/126; A23L 7/117; A23L 7/135; A23L 7/139;
(Continued)

(56) References Cited

U.S. PATENT DOCUMENTS 4,450,757 A * 5/1984 Alfio ...................... A47J 27/18
126/374.1
4,502,643 A * 3/1985 Burggrabe ................ B02C 7/13
241/257.1
(Continued)

FOREIGN PATENT DOCUMENTS

JP          9-192627 A      7/1997
JP       2004-511344 A      4/2004
(Continued)

OTHER PUBLICATIONS

"Research Performance Information on Food Examination 2013, No. 26" by National Agriculture and Food Research Organization, Published on Mar. 31, 2014 in Japan, pp. 12-13, p. 12, last line 2.
(Continued)

*Primary Examiner* — Joel M Attey
*Assistant Examiner* — Adam Michael Eckardt
(74) *Attorney, Agent, or Firm* — Norton Rose Fulbright US LLP

(57) ABSTRACT

A rice gel production system for producing rice gel in a form of a gel including: a cooking unit that cooks or steams raw-material rice to obtain cooked rice; a cooked rice conveyance unit that conveys the cooked rice; and a pulverizing unit that receives the cooked rice from the cooked rice conveyance unit and pulverizes the cooked rice to obtain rice gel. The pulverizing unit includes: a first pulverizing unit that pulverizes the cooked rice to obtain first pulverized rice; and a second pulverizing unit that pulverizes the first pulverized rice discharged from the first pulverizing
(Continued)

unit, the pulverization by the second pulverizing unit being performed more finely as compared with the pulverization performed by the first pulverizing unit 100A to obtain the rice gel.

19 Claims, 15 Drawing Sheets

(51) Int. Cl.
  *A47J 27/04* (2006.01)
  *A23L 7/10* (2016.01)
  *B65G 49/00* (2006.01)
(52) U.S. Cl.
  CPC ............... *A47J 27/04* (2013.01); *B65G 49/00* (2013.01); *A47J 2027/043* (2013.01)
(58) Field of Classification Search
  CPC . A23L 27/00; A23L 2/385; A23L 2/52; A23L 2/60; A23L 27/204; A23L 27/36; A23L 7/107; A23L 7/115; A23L 7/161; A23L 11/50; A23L 11/70; A23L 19/19; A23L 19/15; A23L 27/10; A23L 33/10; A23L 33/20; A23L 33/21; A23L 33/22; A23L 7/104; A23L 7/197; A23L 7/198; A23L 7/25; A23L 27/20; A23L 27/30; A23L 11/00; A23L 19/10; A23P 10/20; A23P 20/12; A47J 2027/043; A47J 27/00; A47J 27/002; A47J 27/04; B65G 49/00; A23V 2002/00; A23V 2300/24; A23V 2300/50; A23V 2200/264; C07J 17/005; C07J 9/00; C07J 17/00; A21D 13/02; A21D 6/003; A21D 8/042; A21D 13/04; A21D 13/047; A21D 13/062; A21D 13/066; A21D 13/40; A21D 2/36; A21D 2/364; A21D 2/38; A21D 8/02; A21D 6/00; A21D 8/04; A23J 1/125; A23J 1/14; C12P 19/12; C12P 19/14; C12P 19/22; C12Y 302/01001
  See application file for complete search history.

(56) References Cited

U.S. PATENT DOCUMENTS

| | | | | |
|---|---|---|---|---|
| 6,056,986 | A | * | 5/2000 | Miyagawa ............... A47J 27/04 426/510 |
| 2002/0144933 | A1 | | 10/2002 | Detampel |
| 2005/0258015 | A1 | * | 11/2005 | Kinzer ............... B65G 69/0408 198/300 |
| 2007/0042102 | A1 | * | 2/2007 | Furcich .................. A23G 1/56 426/631 |
| 2014/0314941 | A1 | * | 10/2014 | Karwowski ............. A23L 7/117 426/627 |

FOREIGN PATENT DOCUMENTS

| | | |
|---|---|---|
| JP | 2004-323313 A | 11/2004 |
| JP | 2006-136255 A | 6/2006 |
| JP | 2016-158796 A | 9/2016 |
| JP | 2017-163849 A | 9/2017 |
| WO | 2014/199961 A1 | 12/2014 |
| WO | 2016/006051 A1 | 1/2016 |

OTHER PUBLICATIONS

International Search Report dated Jan. 9, 2018 issued in corresponding PCT Application PCT/JP2017/036662.

* cited by examiner

RICE GEL PRODUCTION SYSTEM AND RICE GEL PRODUCTION METHOD

CROSS REFERENCES TO RELATED APPLICATIONS

This application is a national stage application pursuant to 35 U.S.C. § 371 of International Application No. PCT/JP2017/036662, filed on Oct. 10, 2017 which claims priorities under 35 U.S.C. § 119 to Japanese Patent Application No. 2016-219760 filed on Nov. 10, 2016 and Japanese Patent Application No. 2017-128660 filed on Jun. 30, 2017, the disclosures of which are hereby incorporated by reference in their entireties.

TECHNICAL FIELD

The present invention relates to a rice gel production system and a rice gel production method for producing rice gel which is in the form of gel.

BACKGROUND ART

Recently, rice flour which is produced from white rice being ground with a flour mill is in wide use as an ingredient of rice bread or the like (see, for example, Patent Literature 1; hereinafter PTL 1). The rice flour, however, has a disadvantage that starch readily falls into β-form (deterioration) so that the taste of the rice flour cannot be preserved for a long period.

This is why rice gel is receiving attention as a food alternative to the rice flour, because the rice gel is able to preserve its taste for a relatively long period and offers a good handleability. One of known conventional methods for producing the rice gel includes the steps of: adding water to white rice or rice flour, and heating a resultant to obtain a gelatinized material that is in a paste-like state; and mechanically stirring the gelatinized material to obtain rice gel (see, for example, Patent Literature 2; hereinafter PTL 2).

CITATION LIST

Patent Literature

PTL 1: Japanese Patent Application Laid-Open No. 2006-136255
PTL 2: PCT International Publication No. WO2014/199961

SUMMARY OF INVENTION

Technical Problem

Although a technique of producing rice gel from rice is conventionally disclosed, the technique merely shows one example of small-batch production of about 10 kg per day which is just at a prototype-on-table level. A mass production technique is indispensable, assuming that a large amount of rice gel is used as an ingredient of a processed food, for example.

In addition, rice gel is desirably white-colored, considering that it can be used as, for example, an ingredient of ice cream, white sauce, or the like; however, there is a risk that applying heat during a production process may cause discoloration to deteriorate the quality. Moreover, to produce rice gel having a smooth texture and a high palatability, it is required that a granular texture which corresponds to the number of fine rice grains remaining in the rice gel be reduced.

In view of the circumstances described above, the present invention mainly aims to provide a rice gel production system and a rice gel production method that allow mass production of rice gel having a high quality and a high palatability.

Solution to Problem

A first aspect of the present invention is a rice gel production system for producing rice gel in the form of gel, the system including:
a cooking unit that cooks or steams raw-material rice, to obtain cooked rice;
a cooked rice conveyance unit that conveys the cooked rice; and
a pulverizing unit that takes over the cooked rice from the cooked rice conveyance unit and pulverizes the cooked rice, to obtain the rice gel,
the pulverizing unit including
a first pulverizing unit that pulverizes the cooked rice, to obtain first pulverized rice, and
a second pulverizing unit that pulverizes the first pulverized rice discharged from the first pulverizing unit, the pulverization being performed more finely as compared with the pulverization performed by the first pulverizing unit, to obtain the rice gel.

This configuration includes: the cooking unit that cooks or steams raw-material rice, to obtain cooked rice; the cooked rice conveyance unit that conveys the cooked rice; and the pulverizing unit that takes over the cooked rice from the cooked rice conveyance unit and pulverizes the cooked rice, to obtain rice gel. This enables the cooked rice to be automatically conveyed from the cooking unit to the pulverizing unit by the cooked rice conveyance unit, so that the pulverizing unit can successively produce the rice gel. Accordingly, mass production of the rice gel can be enabled.

The configuration further includes a two-stage pulverizing unit having a first pulverizing unit and a second pulverizing unit arranged in series. The first pulverizing unit pulverizes cooked rice relatively roughly, to obtain first pulverized rice, and the second pulverizing unit pulverizes the first pulverized rice more finely, to produce rice gel. This allows each of the pulverizing units to suffer a reduced load on pulverization. As a result, each of the pulverizing units has an increased throughput, and therefore the yield of rice gel can be further increased. Since each pulverizing unit suffers a reduced load on pulverization, it may be possible to have reduced frictional heat applied to the cooked rice or the first pulverized rice which is a pulverization object during pulverization in each of the pulverizing units, while sufficiently pulverizing the rice gel in the second pulverizing unit so as to obtain a reduced granular texture. This can reduce or minimize discoloration of the rice gel which may otherwise be caused by the frictional heat. Thus, the rice gel having a high quality and a high palatability can be produced.

A second aspect of the present invention includes a first pulverized rice conveyor that conveys the first pulverized rice discharged from the first pulverizing unit to the second pulverizing unit.

This configuration, which includes the first pulverized rice conveyor, enables the first pulverized rice discharged from the first pulverizing unit to be automatically conveyed to the second pulverizing unit, so that rice gel can be successively produced by the pulverizing units. Accordingly, mass production of the rice gel can be further enhanced.

In a third aspect of the present invention, the second pulverizing unit is constituted by a millstone-type friction grinding apparatus that includes an upper mill part and a lower mill part and that pulverizes the first pulverized rice by causing a pulverization object to pass through a gap between the upper and lower mill parts rotating relative to each other.

In this configuration, the second pulverizing unit for pulverizing the first pulverized rice more finely to obtain rice gel can be suitably constituted by the millstone-type friction grinding apparatus as mentioned above. In the millstone-type friction grinding apparatus that constitutes the second pulverizing unit, the first pulverized rice passes through the gap between the upper and lower mill parts rotating relative to each other, and a shear force occurring at a time of the passage is used to finely friction-grinds the first pulverized rice, so that rice gel having a higher smoothness and a high quality can be obtained. In addition, the first pulverized rice which is obtained as a result of relatively rough pulverization performed in advance by the first pulverizing unit is supplied as a pulverization object to the second pulverizing unit. Accordingly, even though the first pulverized rice is finely friction-ground so as to have a reduced granular texture, a load on pulverization can be suppressed low, and thus discoloration which may be caused by frictional heat of the first pulverized rice can be reduced or minimized.

In a fourth aspect of the present invention, the first pulverizing unit is constituted by a millstone-type friction grinding apparatus that includes an upper mill part and a lower mill part and that pulverizes the cooked rice by causing a pulverization object to pass through a gap between the upper and lower mill parts rotating relative to each other, and a gap width in the second pulverizing unit is set smaller than a gap width in the first pulverizing unit, the gap width being a width of the gap between the upper and lower mill parts.

In this configuration, both of the first and second pulverizing units are constituted by millstone-type friction grinding apparatuses, and the gap width in the second pulverizing unit is set smaller than the gap width in the first pulverizing unit. In the first pulverizing unit, therefore, the cooked rice which has a relatively large grain size passes through the gap between the upper and lower mill parts which is relative wide, so that as large an amount of cooked rice as possible can be pulverized relatively roughly. In the second pulverizing unit, on the other hand, the first pulverized rice which has a relatively small grain size passes through the gap between the upper and lower mill parts which is relatively narrow, so that the first pulverized rice can be friction-ground as finely as possible, to obtain rice gel having a higher smoothness and a high quality.

A fifth aspect of the present invention is a rice gel production method for producing rice gel in the form of gel, the method including a pulverization step of pulverizing cooked rice obtained by cooking or steaming raw-material rice, to obtain rice gel in the form of gel, the pulverization step including:
a first pulverization step of pulverizing the cooked rice, to obtain first pulverized rice; and
a second pulverization step of pulverizing the first pulverized rice obtained in the first pulverization step, the pulverization being performed more finely as compared with the pulverization performed in the first pulverization step, to obtain the rice gel.

In this configuration, the cooked rice is relatively roughly pulverized in the first pulverization step to result in first pulverized rice, and the first pulverized rice is more finely pulverized in the second pulverizing step to produce rice gel. This can reduce a load on pulverization in each of the pulverization steps. Accordingly, the throughput in each pulverization step can be increased, and therefore the yield of rice gel can be further increased. Since a load on pulverization in each pulverization step is reduced, it may be possible to have reduced frictional heat applied to the cooked rice or the first pulverized rice which is a pulverization object during pulverization in each pulverization step while sufficiently pulverizing the rice gel in the second pulverization step so as to obtain a reduced granular texture. This can reduce or minimize discoloration of the rice gel which may otherwise be caused by the frictional heat. Thus, the rice gel having a high quality and a high palatability can be produced.

A sixth aspect of the present invention is a rice gel production system for producing rice gel in the form of gel, the system including:
a cooking unit that cooks or steams raw-material rice, to obtain cooked rice;
a cooked rice conveyance unit that conveys the cooked rice; and
a pulverizing unit that takes over the cooked rice from the cooked rice conveyance unit and pulverizes the cooked rice, to obtain the rice gel.

This configuration includes: the cooking unit that cooks or steams raw-material rice, to obtain cooked rice; the conveyor that conveys the cooked rice; and the pulverizing unit that takes over the cooked rice from the conveyor and pulverizes the cooked rice, to obtain rice gel. This enables the cooked rice to be automatically conveyed from the cooking unit to the pulverizing unit by the conveyor, so that the pulverizing unit can successively produce rice gel. Accordingly, mass production of the rice gel can be enabled.

In a seventh aspect of the present invention, at a time of being supplied to the pulverizing unit, the cooked rice has a temperature higher than its temperature at a time of deteriorating.

If cooked rice, in which a starch component of raw-material rice is gelatinized (or in alpha($\alpha$)-form), has its temperature lowered, a deterioration (or falling into beta($\beta$)-form) of the cooked rice progresses. As a result, the hardness of the cooked rice increases, which makes an increased load applied to pulverization at a time of the pulverizing unit pulverizing the cooked rice. This may cause breakdown or shortening of lifetime of the pulverizing unit.

In this respect, the above-described configuration supplies to the pulverizing unit the cooked rice having a temperature higher than a temperature at which the cooked rice deteriorates. This can prevent an increase in load on pulverization performed by the pulverizing unit, which may otherwise be caused by deterioration of the cooked rice. This can accordingly prevent occurrence of breakdown or shortening of lifetime of the pulverizing unit. Consequently, maintenance/management costs for the pulverizing unit can be reduced, and moreover the frequency of repair or replacement of the pulverizing unit can be reduced, so that stable production of rice gel can be achieved.

In an eighth aspect of the present invention, the pulverizing unit includes a plurality of pulverizing machines, and
the cooked rice conveyance unit takes over the cooked rice from the cooking unit, and distributes and supplies the cooked rice to the plurality of pulverizing machines.

This configuration allows the cooked rice coming from the cooking unit to be pulverized concurrently in the plurality of pulverizing machines, to produce rice gel. This allows employment of a cooking unit with a higher cooked rice production capacity, and thus enables a further increase in rice gel production capacity.

In a ninth aspect of the present invention, the cooked rice conveyance unit includes a main conveyor and a plurality of input conveyors, the main conveyor being coupled to the cooking unit, the plurality of input conveyors being coupled to the main conveyor and also coupled in series to one another, one of the input conveyors serving as a first stage has its midway portion located below a conveyance downstream end of the main conveyor, and one of the pulverizing machines or a midway portion of another of the input conveyors serving as a subsequent stage are located below opposite ends of the one input conveyor, and through switchover of conveyance directions of the input conveyors, the cooked rice is supplied to the pulverizing machines or to the subsequent input conveyors, so that the cooked rice is distributed and supplied to the plurality of pulverizing machines.

This configuration makes it possible to distribute and supply the cooked rice to the plurality of pulverizing machines with a simple configuration.

In a tenth aspect of the present invention, the cooking unit is constituted by a continuous-type rice cooking machine that heats a plurality of cooking pots in which the raw-material rice and cooking water are contained while conveying the plurality of cooking pots, to obtain the cooked rice, and the cooked rice conveyance unit turns over the cooking pots to take the cooked rice out of the cooking pots, and supplies the cooked rice to the pulverizing unit.

This configuration enables mass production of cooked rice, and also enables the conveyor to take the cooked rice out of the cooking pots and to automatically supply the cooked rice to the pulverizing unit. Accordingly, mass production of the rice gel can be enabled.

In an eleventh aspect of the present invention, the cooking unit is constituted by a continuous rice cooking apparatus that steams the raw-material rice while conveying the raw-material rice with a conveyor.

This configuration can increase the cooked rice production capacity and thus can further increase the rice gel production capacity, as compared with, for example, a rice cooking apparatus that cooks rice in a plurality of cooking pots being conveyed by a conveyor.

A twelfth aspect of the present invention includes:

a rice gel transport unit that transports the rice gel obtained by the pulverizing unit; and a gel packaging unit that takes over the rice gel from the rice gel transport unit, and packages the rice gel in small quantities.

This configuration, in which the gel packaging unit packages rice gel in small quantities, can bring the rice gel into an easy-to-dispatch state.

In a thirteenth aspect of the present invention, the rice gel transport unit transports the rice gel with a single eccentric screw pump.

The single eccentric screw pump included in this configuration is capable of transporting a highly viscous fluid, and therefore even when rice gel obtained by the pulverizing unit has a high viscosity, the rice gel can be transported to a packing unit.

DESCRIPTION OF EMBODIMENT

In the following, some embodiments of the present invention will be described with reference to the drawings. The term "cooked rice" as used herein and in the claims attached hereto, for example, means a gelatinized material obtained by gelatinizing a starch component of raw-material rice as a result of adding water to and heating the raw-material rice. The cooked rice also includes, for example, so-called steamed rice.

Figure 1:
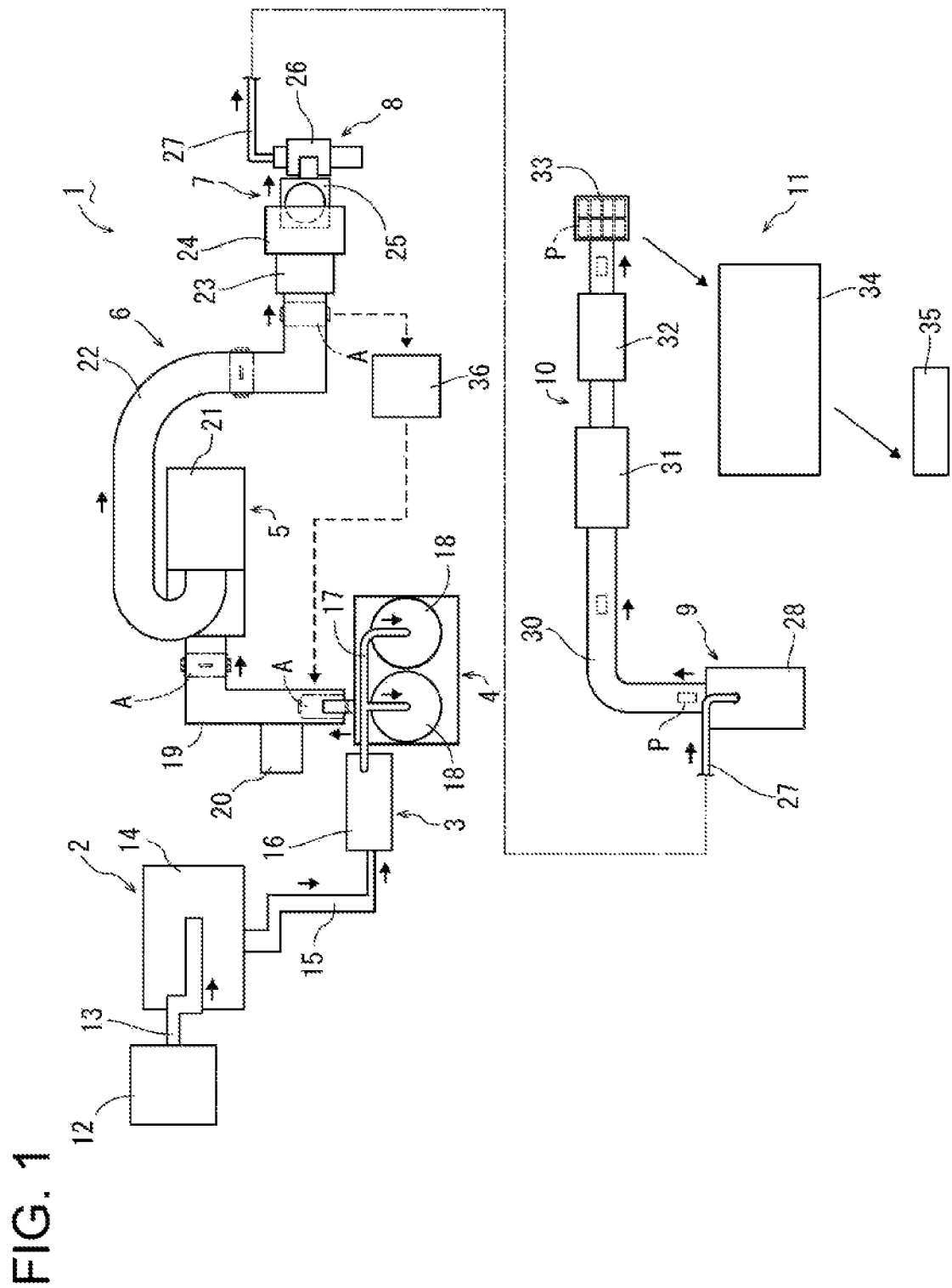
FIG. 1 A schematic plan view showing a rice gel production system according to an embodiment.
Figure 2:
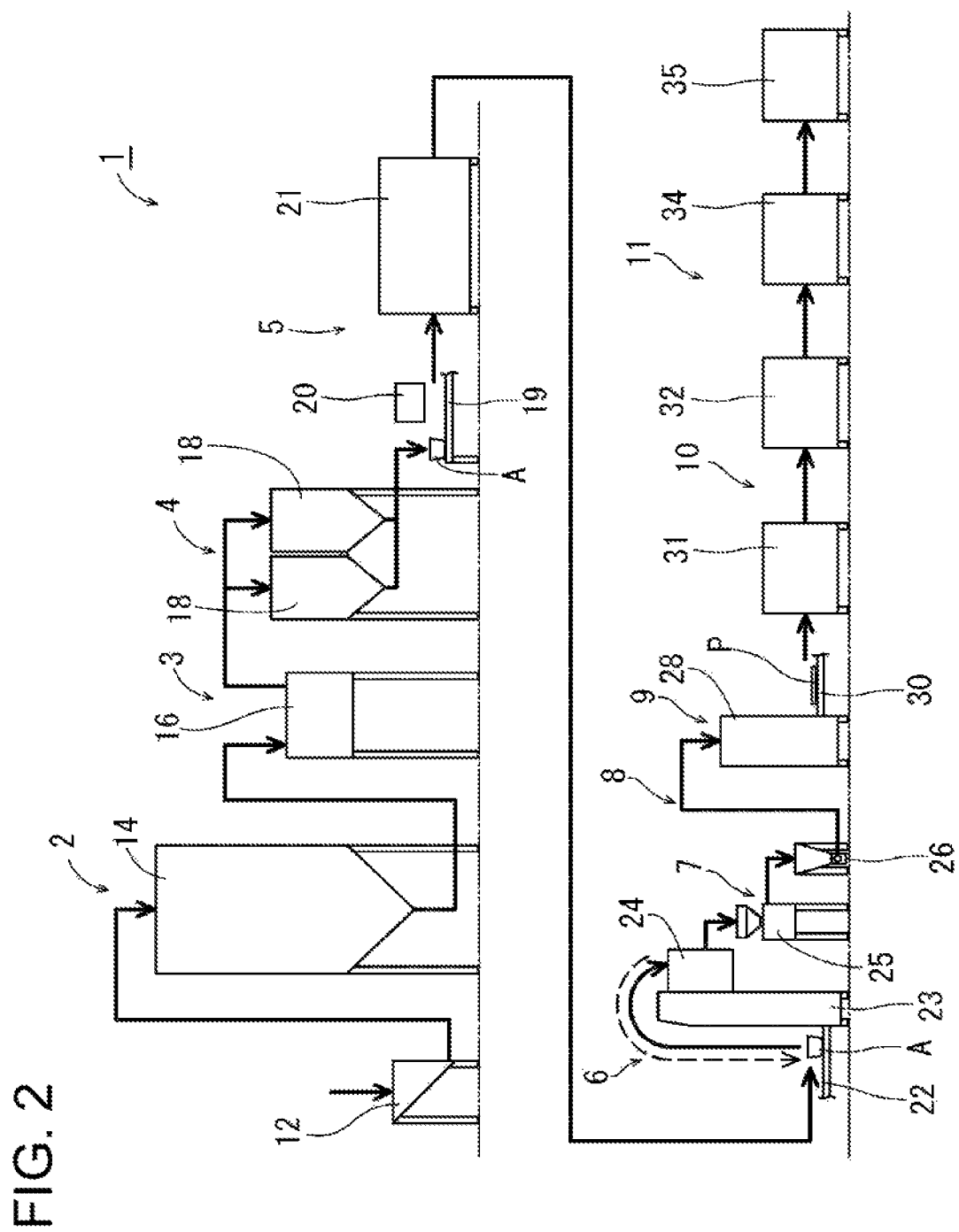
FIG. 2 A diagram showing a schematic configuration according to the embodiment.

FIG. 1 is a schematic plan view showing a rice gel production system according to an embodiment. FIG. 2 is a diagram showing a schematic configuration according to the embodiment. Roughly, a rice gel production system 1 includes: a rice storage unit 2 that stores raw-material rice; a rice washing unit 3 that washes the raw-material rice in water; a soaking unit 4 that soaks washed rice; a cooking unit 5 that cooks soaked rice; a cooked rice conveyance unit 6 that conveys cooked rice; a pulverizing unit 7 that pulverizes the cooked rice to obtain rice gel; a rice gel transport unit 8 that transports the rice gel; a gel packaging unit 9 that packages the rice gel in small quantities; an inspection unit 10 that inspects rice gel packages; and a dispatch unit 11 that dispatches rice gel pouches.

Raw-material rice such as unpolished rice or polished white rice is inputted to a rice input hopper 12 in the rice storage unit 2, then is lifted by a rice input elevator 13, and then is inputted from the upper side of a rice input room 14 to be received by the rice input room 14. The rice input room 14, which includes a measuring device that measures an amount of raw-material rice to be discharged from the lower side of the rice input room 14, discharges a predetermined amount of raw-material rice. The raw-material rice discharged from the rice input room 14 is sent to a rice washing machine 16 of the rice washing unit 3 by a raw-material rice conveyor 15 which includes an elevator and the like. The rice washing machine 16 washes the raw-material rice in water, to provide washed rice which is then sent to a soaking tank 18 of the soaking unit 4 through a washed rice transport pipe 17, so that the washed rice is soaked in the soaking tank 18 for about one hour and a half, for example.

Soaked rice in the soaking tank 18 is measured and dewatered, and is supplied in predetermined amounts to the cooking pot A. The rice gel production system 1 includes a plurality of cooking pots A and a conveyor 19 that conveys the cooking pots A to the cooking unit 5. A predetermined amount of soaked rice is supplied from the soaking tank 18 to an empty cooking pot A disposed upstream of the conveyor 19 in a conveyance direction. A water adding machine 20 supplies a predetermined amount of cooking water to the cooking pot A. The cooking pot A having the soaked rice (raw-material rice) and the cooking water is conveyed toward the cooking unit 5 by the conveyor 19, is covered with a lid at a lidding place (not shown) which exists on the way of conveyance, and is then sent to a continuous-type rice cooking machine 21 of the cooking unit 5.

The continuous-type rice cooking machine 21 is provided therein with a conveyor and a heat source (not shown) for heating the cooking pot A while conveying it, to cook the soaked rice contained in the cooking pot A. The conveyor 19 successively supplies cooking pots A having soaked rice and cooking water to the continuous-type rice cooking machine 21. The continuous-type rice cooking machine 21 continuously cooks soaked rice contained in a plurality of cooking pots A taken over from the conveyor 19. The heat source of the continuous-type rice cooking machine 21 may be of any type, examples of which include a gas type and an IH (Induction Heating) type.

The cooking pot A having cooked rice after cooked by the continuous-type rice cooking machine 21 is taken over by a conveyance conveyor 22 of the cooked rice conveyance unit 6. The cooked rice conveyance unit 6 includes the conveyance conveyor 22, an automatic turnover machine 23, and a loosening machine 24. The cooked rice in the cooking pot A taken over from the continuous-type rice cooking machine 21 is let steam on the conveyance conveyor 22, while the cooking pot A is being conveyed to the automatic turnover machine 23. On the conveyance downstream end side of the conveyance conveyor 22, the lid on the cooking pot A is removed by an unlidding machine (not shown), and then the cooking pot A is lifted and turned over by the automatic turnover machine 23. Thus, the cooked rice is taken out of the cooking pot A, and is supplied to the loosening machine 24.

The loosening machine 24 stirs and loosens the cooked rice. Loosened cooked rice is supplied to pulverizing equipment 25 included in the pulverizing unit 7. At a time of being supplied to the pulverizing equipment 25, the cooked rice has a temperature (of about 85° C. in this embodiment) higher than its temperature at a time of deteriorating. At a time of being let steam during conveyance on the conveyance conveyor 22, the cooked rice has a temperature of about 90° C. The pulverizing equipment 25, which is constituted by a millstone-type friction grinding apparatus (also called as a melting grinder) for example, pulverizes the cooked rice to obtain rice gel. It is only required that the pulverizing equipment 25 be configured to obtain rice gel by pulverizing cooked rice, and how to pulverize is not particularly limited.

The rice gel obtained by the pulverizing equipment 25 is supplied to a transport pump 26 of the rice gel transport unit 8. The transport pump 26, which is constituted by a single eccentric screw pump called a mohno pump for example, transports the rice gel to a packing machine 28 of the gel packaging unit 9 via a rice gel transport pipe 27. The rice gel transport pipe 27 is made of, for example, stainless steel.

The gel packaging unit 9 packages the rice gel in small quantities. The packing machine 28 of the gel packaging unit 9 makes pouches from a resin film, fills the pouch-shaped resin film with the rice gel, seals a pouch each time the pouch is filled with a predetermined amount (for example, 5 kg) of the rice gel, and cuts the resin film into separate pouches, to thereby obtain rice gel packages P one after another.

The rice gel packages P obtained by the gel packaging unit 9 are conveyed to the inspection unit 10 by a conveyor 30. In the inspection unit 10, a foreign substance detector 31 inspects the rice gel package P for the presence or absence of a foreign substance therein, and a weight inspector 32 inspects the rice gel package P for the weight thereof being within a predetermined weight range. After the inspection is completed, the rice gel packages P are successively placed onto a moving carriage 33 of the dispatch unit 11. In the dispatch unit 11, a plurality of rice gel packages P are conveyed together with the moving carriage 33, are heat-sterilized and cooled by a sterilizer 34, are successively subjected to water removal by a water remover 35, and are then packed in a box, so that the rice gel packages P are ready for dispatch.

In the cooked rice conveyance unit 6, the cooking pot A returned to the conveyance conveyor 22, which is empty after the cooked rice is taken out therefrom by the automatic turnover machine 23, is conveyed to a pot washing machine 36 by hand, for example, to be washed and then disposed at a soaked rice supply position which is located on the conveyance upstream end side of the conveyor 19. Here, as indicated by the broken line arrows in FIG. 1, the empty cooking pot A returned to the conveyance conveyor 22 may be automatically moved from the conveyance conveyor 22 to the pot washing machine 36 by another conveyor or the like, to be automatically washed in the pot washing machine 36, and then may be automatically disposed at the soaked rice supply position in the conveyor 19 by still another conveyor or the like. Thus, the cooking pot A automatically moves in a cycle through a movement path including the conveyor 19, the continuous-type rice cooking machine 21, the conveyance conveyor 22, the automatic turnover machine 23, and the pot washing machine 36. This requires less labor of an operator.

The rice gel production system 1 of this embodiment includes: the cooking unit 5 that cooks or steams raw-material rice, to obtain cooked rice; the cooked rice conveyance unit 6 that conveys the cooked rice; and the pulverizing unit 7 having the pulverizing equipment 25 that pulverizes the cooked rice taken over from the cooked rice conveyance unit 6, to obtain rice gel. This enables the cooked rice to be automatically conveyed from the cooking unit 5 to the pulverizing unit 7 by the cooked rice conveyance unit 6, so that the pulverizing unit 7 can successively produce the rice gel. Accordingly, mass production of the rice gel can be enabled.

The rice gel production system 1 supplies cooked rice to the pulverizing equipment 25, the cooked rice having a temperature (of about 85° C., for example) higher than its temperature at a time of deteriorating. This can prevent an increase in load on pulverization performed by the pulverizing equipment 25, which may otherwise be caused by deterioration of the cooked rice. This can accordingly prevent occurrence of breakdown or shortening of lifetime of the pulverizing equipment 25. Consequently, maintenance/management costs for the pulverizing unit 7 can be reduced, and moreover the frequency of repair or replacement of the pulverizing equipment 25 can be reduced, so that stable production of rice gel can be achieved. The temperature at which a starch component of rice is gelatinized as a result of water addition and heating is roughly about 60° C., and the starch component is rapidly gelatinized at about 80 to 90° C. Cooked rice, in which the starch component is gelatinized, has its deterioration accelerate as its temperature falls below roughly 20° C. This is why the temperature of cooked rice supplied to the pulverizing equipment 25 is preferably higher than a temperature at which the cooked rice deteriorates. For example, the temperature of the cooked rice is 20° C. or more, and more preferably 30° C. or more, and further preferably 60° C. or more.

In the rice gel production system 1, the cooking unit 5 includes the continuous-type rice cooking machine 21 that heats a plurality of cooking pots A in which raw-material rice (soaked rice) and cooking water are contained while conveying the plurality of cooking pots A, to obtain cooked rice. The cooked rice conveyance unit 6 turns over the cooking pots A to take the cooked rice out of the cooking pots A, and supplies the cooked rice to the pulverizing unit 7. This enables mass production of the cooked rice, and also enables the cooked rice conveyance unit 6 to take the cooked rice out of the cooking pots A and to automatically supply the cooked rice to the pulverizing unit 7. Accordingly, mass production of rice gel can be enabled.

The rice gel production system 1 includes: the rice gel transport unit 8 that transports the rice gel obtained by the pulverizing unit 7; and the gel packaging unit 9 that packages the rice gel taken over from the rice gel transport unit 8 in small quantities. Thus, the gel packaging unit 9 can package the rice gel in small quantities into rice gel packages P, for example, to bring the rice gel into an easy-to-dispatch state. How the gel packaging unit 9 packages the rice gel in small quantities is not particularly limited, and any way of packaging is adoptable as long as the rice gel can be packaged in small quantities. For example, it may be acceptable that the gel packaging unit 9 successively packages the rice gel in small quantities into a plurality of containers such as tanks.

The rice gel transport unit 8 transports the rice gel with the transport pump 26 constituted by a single eccentric screw pump which is capable of transporting a highly viscous fluid. Thus, even when the rice gel obtained by the pulverizing unit 7 has a high viscosity, it is possible to transport the rice gel to the gel packaging unit 9.

In the following, a detailed configuration of the pulverizing equipment 25, which serves as the pulverizing unit 7 in the rice gel production system 1, will be described based on FIG. 3.

Figure 3:
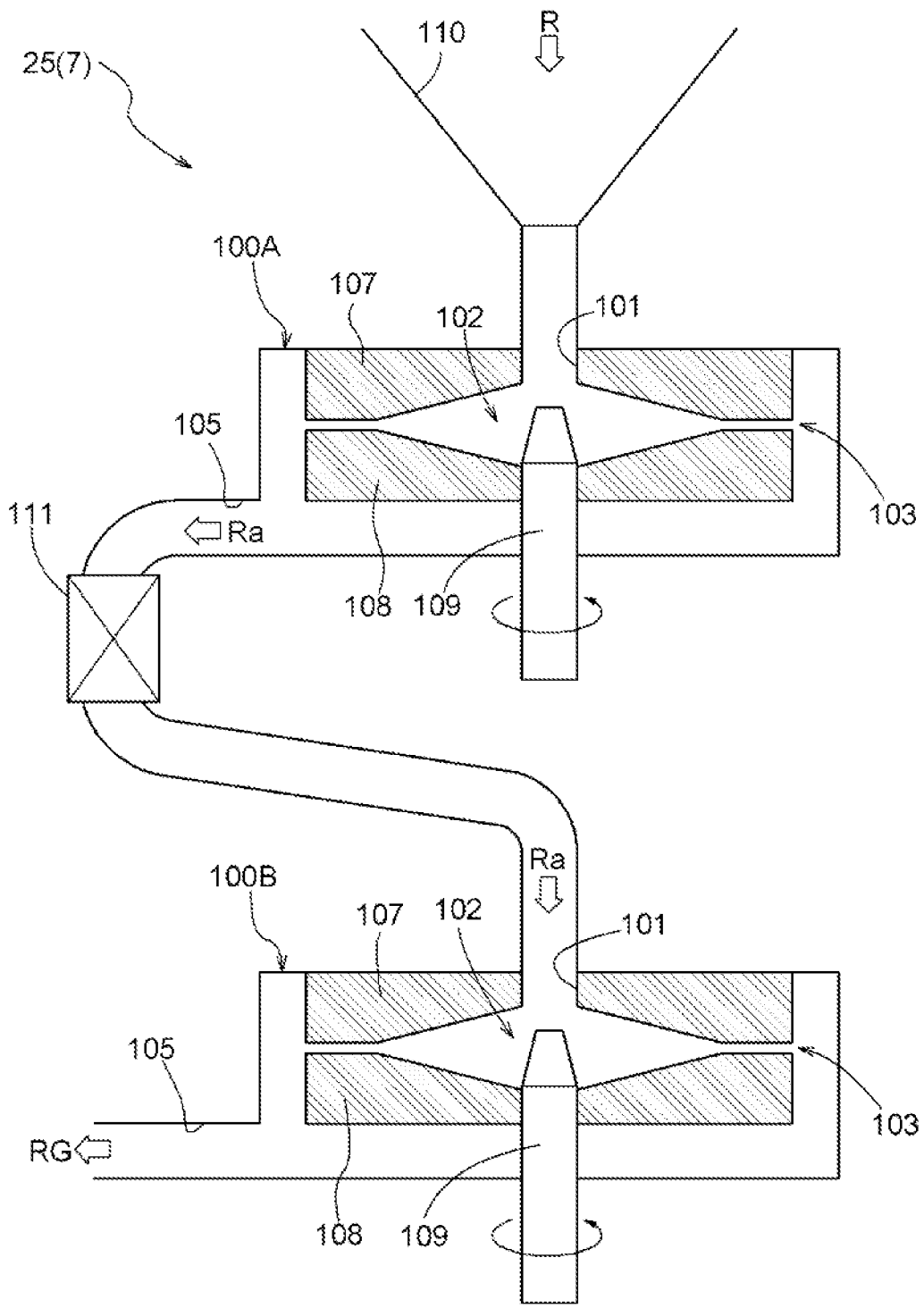
FIG. 3 An elevated cross-sectional view showing a schematic configuration of pulverizing equipment which serves as a pulverizing unit.

FIG. 3 is an elevated cross-sectional view showing a schematic configuration of the pulverizing equipment 25.

The pulverizing equipment 25 is configured to perform a pulverization step of pulverizing cooked rice R supplied from the loosening machine 24 (see FIG. 1 and FIG. 2), to obtain rice gel RG in the form of gel.

The pulverizing equipment 25 is configured as a two-stage pulverizing unit 7 including a first pulverizing unit 100A as a preceding unit and a second pulverizing unit 100B as a subsequent unit that are arranged in series.

The first pulverizing unit 100A is configured to perform a first pulverization step of relatively roughly pulverizing the cooked rice R supplied from the loosening machine 24 (see FIG. 1 and FIG. 2) to a hopper 110, to obtain first pulverized rice Ra.

The second pulverizing unit 100B is configured to perform a second pulverization step of pulverizing the first pulverized rice Ra discharged from the first pulverizing unit 100A, the pulverization being performed more finely as compared with the pulverization performed by the first pulverizing unit 100A, to obtain rice gel RG. The rice gel RG obtained by the second pulverizing unit 100B is transported to the gel packaging unit 9 (see FIG. 1 and FIG. 2).

Since the cooked rice R is pulverized by the two-staged pulverizing equipment 25, each of the pulverizing units 100A, 100B suffers a reduced load on pulverization.

Accordingly, the throughput increases as compared with a case where pulverization is performed by a single-staged pulverizing equipment. Furthermore, reduced frictional heat is applied to the cooked rice R or the first pulverized rice Ra which is a pulverization object during pulverization in each of the pulverizing units 100A, 100B, while the rice gel RG is sufficiently pulverized in the second pulverizing unit 100B so as to obtain a reduced granular texture. This can reduce or minimize discoloration of the rice gel RG which may otherwise be caused by the frictional heat. Thus, the rice gel RG having a high quality and a high palatability can be produced.

Each of the pulverizing units 100A, 100B is configured as a known millstone-type friction grinding apparatus.

Each of the pulverizing units 100A, 100B includes disc-shaped upper and lower mill parts 107 and 108 with a gap 103 formed between a lower surface of the upper mill part 107 and an upper surface of the lower mill part 108. While the upper and lower mill parts 107 and 108 are rotating relative to each other, a pulverization object R, Ra passes through the gap 103, so that the pulverization object R, Ra is pulverized. In more detail, a rotational drive shaft 109 which is rotationally driven by a motor (not shown) is fixed to a central portion of the lower mill part 108, and as the rotational drive shaft 109 is rotationally driven, the lower mill part 108 is rotated relative to the upper mill part 107 which is kept in a stationary state.

The pulverization object R, Ra which is unprocessed is inputted to an input space 102 through an input port 101. The input space 102 is provided on the central side of the gap 103. The input port 101 is provided in a central portion of the upper mill part 107. The pulverization object R, Ra inputted in the input space 102 is thrust outward by rotational drive of the lower mill part 108, to pass through the gap 103. The rotation of the lower mill part 108 relative to the upper mill part 107 applies a shear force to the pulverization object R, Ra passing through the gap 103. As a result, the pulverization object R, Ra is pulverized, falls out from the gap 103, and is ejected outside through a discharge port 105.

In order that the rice gel RG can be successively produced with the pulverizing units 100A, 100B, the pulverizing equipment 25 is provided with a first pulverized rice conveyor 111 that automatically conveys the first pulverized rice Ra, which has been discharged from the discharge port 105 of the first pulverizing unit 100A, to the input port 101 of the second pulverizing unit 100B. The first pulverized rice conveyor 111 is constituted by a single eccentric screw pump called a mohno pump, for example.

Each of the friction grinding apparatuses configuring the pulverizing units 100A, 100B is configured such that a gap width which is the width of the gap 103 between the lower surface of the upper mill part 107 and the upper surface of the lower mill part 108 is changeable as a parameter that determines how fine the pulverization object R, Ra is to be pulverized. The gap width in the second pulverizing unit 100B is set smaller than the gap width in the first pulverizing unit 100A. In the first pulverizing unit 100A, therefore, the cooked rice R having a relatively large grain size passes through the relatively wide gap 103 between the upper mill part 107 and the lower mill part 108, so that a large amount of cooked rice R can be pulverized relatively roughly. In the second pulverizing unit 100B, on the other hand, the first pulverized rice Ra having a relatively small grain size passes through the relatively narrow gap 103 between the upper mill part 107 and the lower mill part 108, so that the first pulverized rice Ra can be friction-ground as finely as possible, to obtain the rice gel RG having a higher smoothness and a high quality.

Examples of the present invention and comparative examples of another invention were evaluated for the productivity and quality of rice gel. Details thereof will be described below.

Example 1

In example 1, pulverizing equipment having two friction grinding apparatuses (masscolloiders manufactured by MASUKO SANGYO CO., LTD.) arranged in series was prepared, and a pulverization test for successively pulverizing cooked rice with the two-stage friction grinding apparatuses was conducted, to obtain rice gel. In the example 1, first pulverized rice obtained by pulverization with a preceding friction grinding apparatus was immediately inputted as a processing object to a subsequent friction grinding apparatus.

In the example 1, a gap width H in the preceding friction grinding apparatus serving as the first pulverizing unit was set to 260 μm, and a gap width H in the subsequent friction grinding apparatus serving as the second pulverizing unit was set to 210 μm.

In the tables below, S2-1 and S2-2 indicate evaluations on the two-stage pulverizing equipment employed in the example 1. S2-1 indicates an evaluation on the preceding friction grinding apparatus employed in the example 1, and S2-2 indicates an evaluation on the subsequent friction grinding apparatus employed in the example 1.

Comparative Example 1

In comparative example 1, a friction grinding apparatus similar to that of the example 1 was prepared, and a pulverization test for pulverizing cooked rice with a single-stage friction grinding apparatus was conducted, to obtain rice gel.

In the comparative example 1, a gap width H in the friction grinding apparatus was set to 220 μm.

In the tables below, S1 indicates an evaluation on the friction grinding apparatus employed in the comparative example 1.

[Details and Results of Evaluations]

Details and results of the evaluations about the example 1 and the comparative example 1 will be given below.

(Productivity Evaluation)

In each of the example 1 and the comparative example 1, a pulverization test for pulverizing cooked rice with a predetermined weight (11.25 kg) was conducted twice. A cooling time for cooling down the friction grinding apparatus was given between a first pulverization test and a second pulverization test.

Results of the tests are shown in Table 1 below.

TABLE 1

| | H μm | θ ° C. | $T_1$ sec | $T_2$ sec | $T_{ave}$ sec | $T_C$ sec | $T_A$ sec | AT — |
|---|---|---|---|---|---|---|---|---|
| S1 | 220 | | 75.1 | 78.9 | 77.0 | 103.0 | 180.0 | 1.00 |
| S2-1 | 260 | 87 | 44.2 | 45 | 44.6 | 15.0 | 59.6 | — |
| S2-2 | 210 | 83 | 53.8 | 57 | 55.4 | 10.0 | 65.4 | 2.75 |

What are represented by the quantity symbols in Table 1 above are as follows:

θ represents a core temperature (° C.) of a pulverization object at a time of pulverization;

$T_1$ represents a processing time (sec) from when a pulverization object was inputted to when discharge of rice gel was completed in the first pulverization test;

$T_2$ represents a processing time (sec) from when a pulverization object was inputted to when discharge of rice gel was completed in the second pulverization test;

$T_{ave}$ represents an average value (sec) of the processing times in the first and second pulverization tests;

$T_C$ represents a cooling time (sec) for cooling down the friction grinding apparatus, the cooling time being given between the first pulverization test and the second pulverization test;

$T_A$ represents a total processing time (sec) which is the sum of the average value $T_{ave}$ of the processing times and the cooling time $T_C$; and AT represents the ratio of the throughput (the reciprocal of the total processing time $T_A$) to the throughput of the comparative example 1, assuming that the throughput of the comparative example 1 is 1.

As seen from Table 1 above, in the comparative example 1 (S1) for pulverizing cooked rice with the single-stage friction grinding apparatus, the average value $T_{ave}$ of the first and second processing times was 77 sec, and the total processing time $T_A$ which equals the cooling time $T_C$ plus the average value $T_{ave}$ was 180 sec.

In the example 1 for pulverizing cooked rice with two-stage friction grinding apparatuses, for example, the average value $T_{ave}$ of the processing times in the preceding friction grinding apparatus (S2-1) was 44.6 sec, and the average value $T_{ave}$ of the processing times in the subsequent friction grinding apparatus (S2-2) was 55.4 sec. It therefore can be seen that the processing times in both of the preceding and subsequent friction grinding apparatuses were shortened as compared with the comparative example 1 (S1). It can be also seen that the core temperature θ of the pulverization object at a time of pulverization with each of the preceding and subsequent friction grinding apparatuses was restrained to less than a limit, temperature (e.g., 110° C.) at which discoloration occurs because of Maillard reaction. Assuming that the cooling times $T_C$ in the preceding and subsequent friction grinding apparatuses were 15 sec and 10 sec, respectively, the total processing time $T_A$ in the preceding friction grinding apparatus (S2-1) was 59.6 sec, and the total processing time $T_A$ in the subsequent friction grinding apparatus (S2-2) was 65.4 sec. The total processing time $T_A$ in the subsequent friction grinding apparatus (S2-2) served as a bottleneck, and input of a processing object was allowed every processing time $T_A$. Thus, the total processing time $T_A$ of the example 1 was 65.4 sec.

The total processing time $T_A$ in the example 1 was 65.4 sec whereas the total processing time $T_A$ in the comparative example 1 was 180 sec. Accordingly, it can be concluded that the throughput AT of the example 1 was 2.75 times the throughput AT of the comparative example 1.

In this example 1, the gap width H in the subsequent friction grinding apparatus was changed to 200 μm, and a pulverization test was conducted under such a condition. As a result, the core temperature of a pulverization object at a time of pulverization rose up to the vicinity of the limit temperature at which discoloration occurs because of Maillard reaction. This is why a lower limit value of the gap width H in the subsequent friction grinding apparatus of the example 1 would be about 200 μm. It can therefore be concluded that an optimal value of the gap width H in the subsequent friction grinding apparatus is about 210 μm as mentioned above.

In this example 1, the gap width in the preceding friction grinding apparatus was set to 260 μm. It however may be also acceptable that the gap width is reduced to 240 μm so that the preceding friction grinding apparatus can pulverize cooked rice relatively more finely, to make pulverization with the subsequent friction grinding apparatus less burdensome.

In this test, the input weight of cooked rice per one input was 11.25 kg. In the example 1 above, however, the core temperature at a time of pulverization leaves some margin, and therefore it may be possible to increase the input weight to about 15 kg, for example.

(Viscosity Evaluation)

Each of the example 1 and the comparative example 1 was evaluated for the viscosity of rice gel obtained as a result of the above-described pulverization test conducted twice. Results of the evaluations are shown in Table 2 below.

TABLE 2

| | H μm | $\mu_1$ Pa·s | $\mu_2$ Pa·s | $\mu_{ave}$ Pa·s | $t_1$ °C. | $t_2$ °C. | $t_{ave}$ °C. |
|---|---|---|---|---|---|---|---|
| S1 | 220 | 185 | 174 | 179.5 | 14.80 | 15.10 | 14.95 |
| S2-1 | 260 | 179 | 186 | 182.5 | 15.70 | 15.30 | 15.50 |
| S2-2 | 210 | 165 | 186 | 175.5 | 16.80 | 17.00 | 16.90 |

What are represented by the quantity symbols in Table 2 above are as follows:

$\mu_1$ represents a viscosity (Pa·s) of rice gel obtained as a result of the first pulverization test;

$\mu_2$ represents a viscosity (Pa·s) of rice gel obtained as a result of the second pulverization test;

$\mu_{ave}$ represents an average value (Pa·s) of a viscosity of rice gel obtained as a result of the first pulverization test and a viscosity of rice gel obtained as a result of the second pulverization test;

$t_1$ represents a temperature (° C.) of rice gel, whose viscosity μ1 was measured;

$t_2$ represents a temperature (° C.) of the rice gel, whose viscosity μ2 was measured; and $t_{ave}$ represents an average value (° C.) of a temperature T1 of rice gel and a temperature T2 of rice gel.

As seen from Table 2 above, the average viscosity value gave of the rice gel obtained in the comparative example 1 was 179.5 Pa·s. The average viscosity value $\mu_{ave}$ of the rice gel obtained by the subsequent friction grinding apparatus (S2-2) of the example 1 was 175.5 Pa·s, which is almost comparable to the viscosity in the comparative example 1.

This leads to conclusion that the example 1 can achieve substantially the same level of rice gel quality as that of the comparative example 1 in terms of the viscosity.

(Moisture Content Evaluation)

Each of the example 1 and the comparative example 1 was evaluated for the moisture content of rice gel obtained as a result of the above-described pulverization test conducted twice. Results of the evaluations are shown in Table 3 below.

TABLE 3

| | H μm | u % |
|---|---|---|
| S1 | 220 | 71.30 |
| S2-1 | 260 | 67.70 |
| S2-2 | 210 | 66.30 |

What are represented by the quantity symbols in Table 3 above are as follows:

u represents a moisture content (%) in rice gel obtained as a result of the pulverization test.

As seen from Table 3 above, the rice gel obtained in the comparative example 1 had a moisture content u of 71.30%. On the other hand, the rice gel obtained by the subsequent friction grinding apparatus (S2-2) of the example 1 had a moisture content u of 66.3%, which is almost comparable to the moisture content of the comparative example 1.

This leads to conclusion that the example 1 can achieve substantially the same level of rice gel quality as that of the comparative example 1 in terms of the moisture content.

(Sensory Properties Evaluation)

Each of the example 1 and the comparative example 1 was evaluated for sensory properties, such as the appearance, color/luster, flavor, and mouthfeel, of rice gel obtained as a result of the above-described pulverization test conducted twice. The evaluations were implemented by a plurality of evaluators actually eating the rice gel.

The evaluations resulted in that the rice gel obtained in the example 1 and the rice gel obtained in the comparative example 1 had substantially no difference in the appearance, color/luster, and flavor. In respect of the mouthfeel, the rice gel obtained in the example 1 was undoubtedly smoother than that in the comparative example 1.

(Granular Texture Evaluation)

Each of the example 1 and the comparative example 1 was evaluated for the granular texture of rice gel obtained as a result of the above-described pulverization test conducted twice. Results of the evaluations are shown in Table 4 below.

TABLE 4

| | H μm | $n_L$ 1/laminate | g g | $n_{10}$ 1/10 g |
|---|---|---|---|---|
| S1 | 220 | 22 | 16.24 | 13.55 |
| S2-1 | 260 | 30 | 17.78 | 16.87 |
| S2-2 | 210 | 5 | 17.24 | 2.90 |

What are represented by the quantity symbols in Table 4 above are as follows:

$n_L$ represents the number of fine rice grains that remained in the rice gel, which was measured by a laminate granular-texture observation (the number of fine rice grains/laminate);

g represents a weight (g) of rice gel used for the laminate granular-texture observation; and $n_{10}$ represents the number of fine rice grains that remained in 10 g of rice gel (the number of fine rice grains/10 g).

The laminate granular-texture observation as mentioned above means a method for observing a granular texture by counting the number of remaining rice grains under a state where rice gel obtained as a result of a pulverization test is thinly spread on a laminate having a predetermined size.

As seen from Table 4 above, the number $n_{10}$ of fine rice grains remaining in 10 g of rice gel obtained in the comparative example 1 was 13.55/10 g. On the other hand, the number $n_{10}$ of fine rice grains remaining in the rice gel obtained by the subsequent friction grinding apparatus (S2-2) of the example 1 was 2.90/10 g, which is considerably reduced as compared with the comparative example 1.

This leads to conclusion that, regarding the granular texture which is one element of the rice gel quality, the example 1 can obtain rice gel that has a considerably higher smoothness than the comparative example 1.

Other Embodiments

Figure 4:
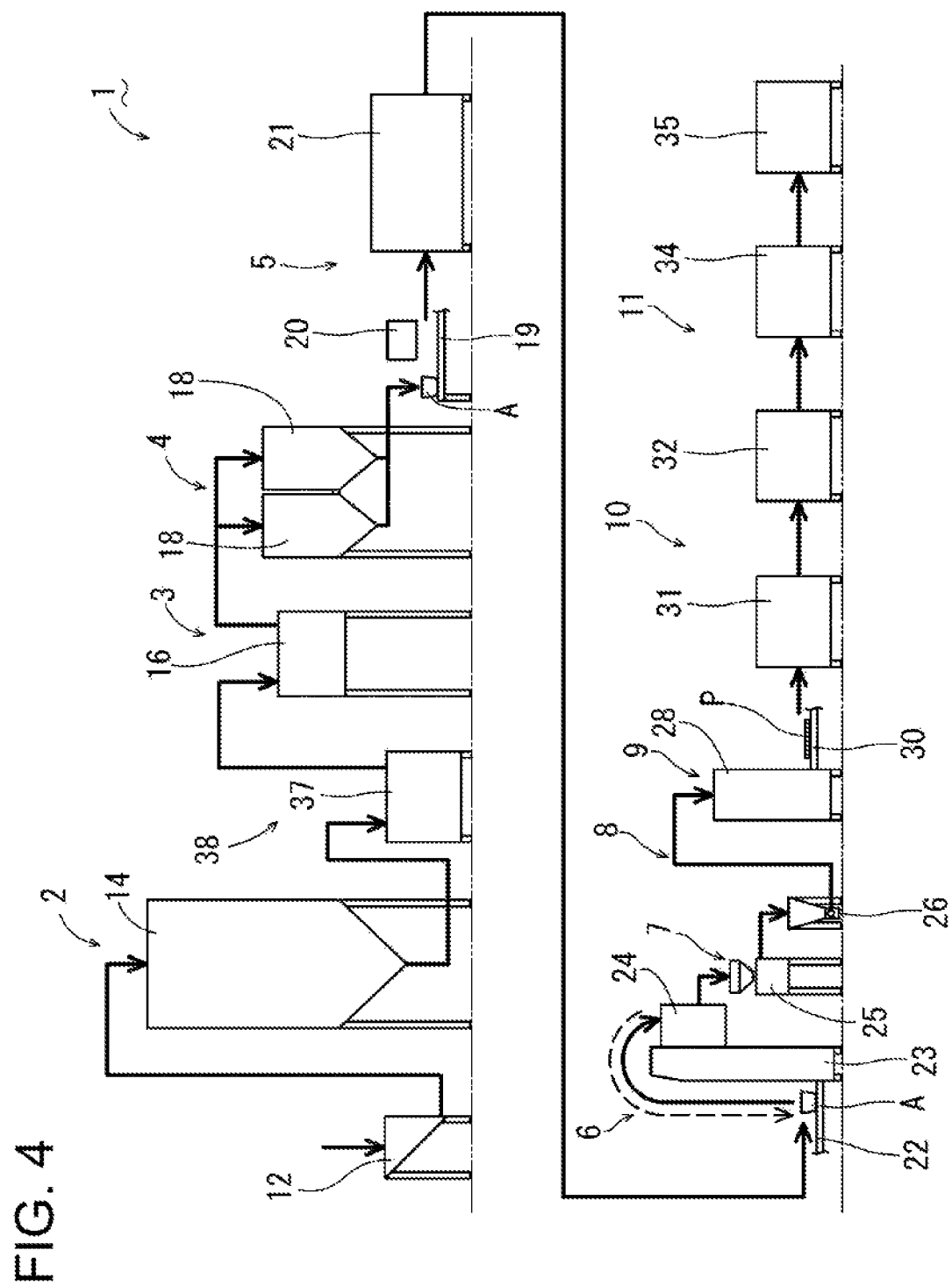
FIG. 4 A diagram showing a schematic configuration of a rice gel production system according to another embodiment.
Figure 5:
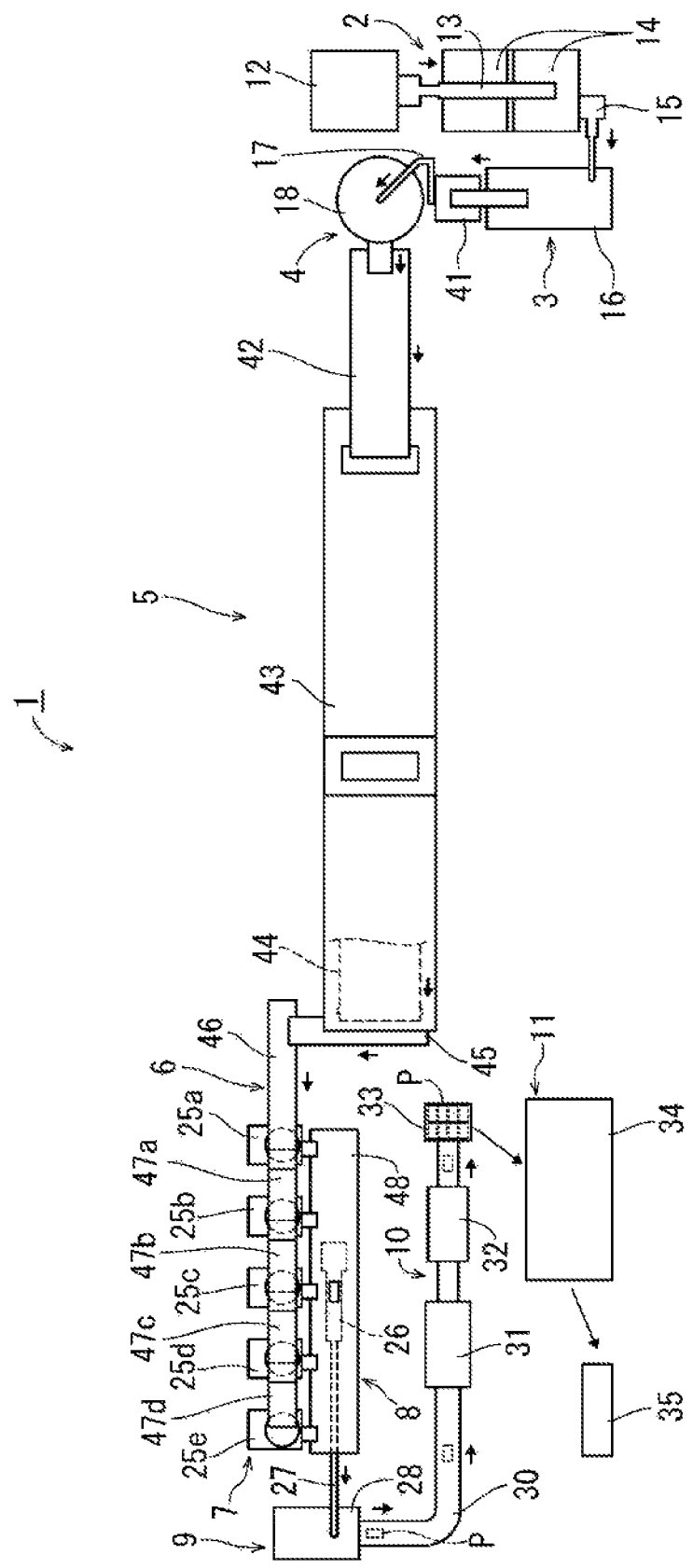
FIG. 5 A schematic plan view showing a rice gel production system according to still another embodiment.
Figure 6:
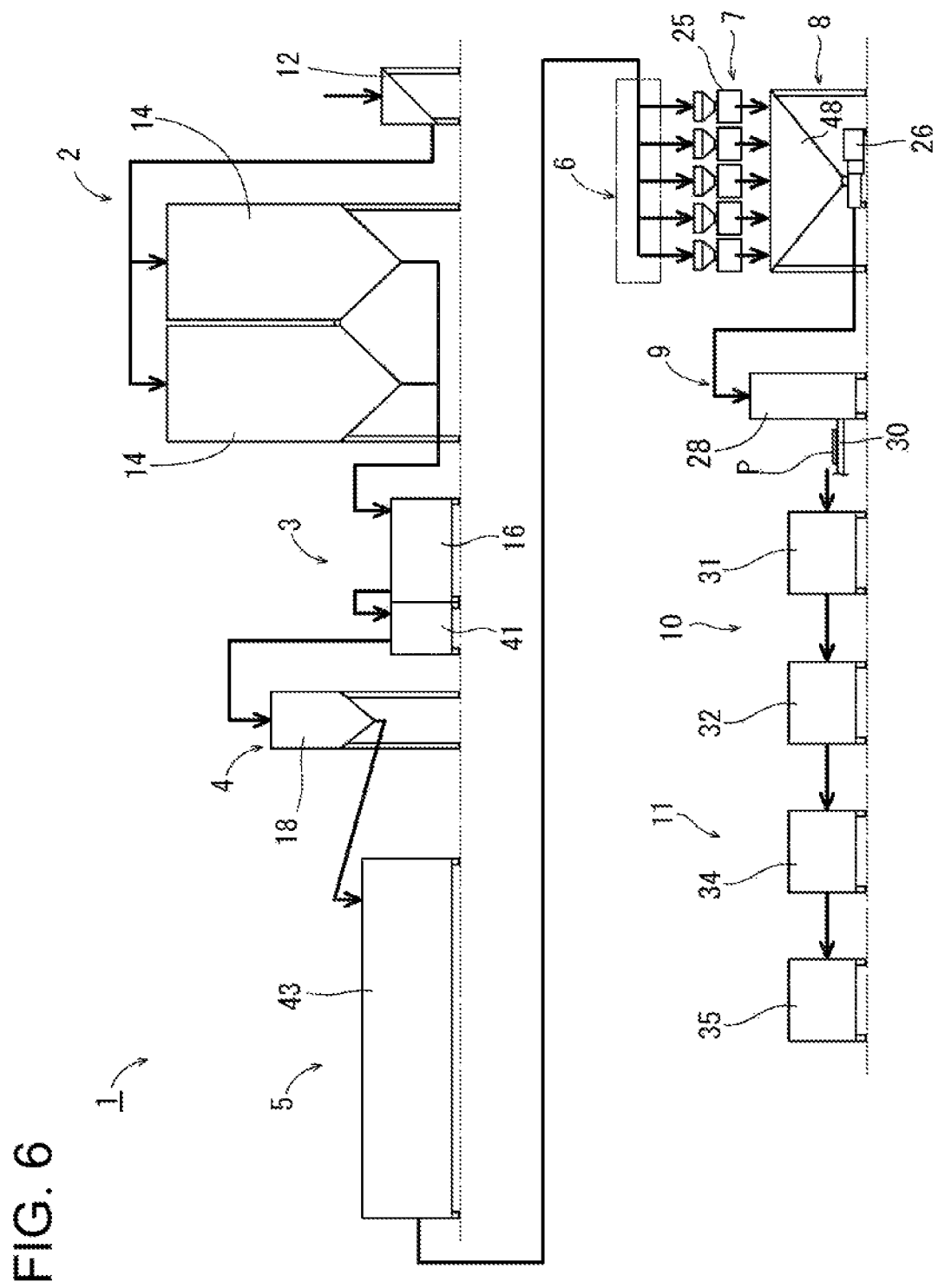
FIG. 6 A diagram showing a schematic configuration according to the embodiment.

FIG. 4 is a diagram showing a schematic configuration of a rice gel production system according to another embodiment. A rice gel production system 1 of this embodiment includes a raw-material rice processing unit 38 that hurts raw-material rice. In this embodiment, the raw-material rice processing unit 38 is disposed between the rice storage unit 2 and the rice washing unit 3. The raw-material rice processing unit 38 includes a pulverizer 37 that performs a damaging process for hurting a surface of rice grains in the raw-material rice or breaking the rice grains. A predetermined amount of raw-material rice is transported from the rice storage unit 2 to the raw-material rice processing unit 38, and raw-material rice having undergone the damaging process in the raw-material rice processing unit 38 is transported to the soaking tank 18 of the soaking unit 4 via the rice washing machine 16 of the rice washing unit 3. Since the raw-material rice undergoes the damaging process before a soaking process, the area of a surface of the raw-material rice that is brought into contact with soaking water is increased, which allows a soaking time to be shortened. It is just required that a position where the raw-material rice processing unit 38 is disposed is a position that allows the raw-material rice processing unit 38 to perform the damaging process before the soaking process is performed on the raw-material rice. For example, the position where the raw-material rice processing unit 38 is disposed may be between the rice input hopper 12 and the rice input room 14 in the rice storage unit 2.

In the embodiment illustrated in FIG. 1 and FIG. 2 and the embodiment illustrated in FIG. 4, a wash-in-water process for washing raw-material rice in water is performed by the rice washing unit 3 while the soaking process is performed in the soaking tank 18 of the soaking unit 4. Alternatively, the wash-in-water process and the soaking process may be performed in the cooking pot A. Alternatively, it may be also acceptable that, after the wash-in-water process for washing raw-material rice in water is performed by the rice washing unit 3, washed rice and soaking water are put in the cooking pot A so that the soaking process is performed in the cooking pot A.

A rice gel production system according to still another embodiment will now be described with reference to FIG. 5 to FIG. 10. A rice gel production system 1 of this embodiment includes: a steam-type continuous rice cooking apparatus 43 provided in the cooking unit 5; a main conveyor 46 and a plurality of input conveyors 47a, 47b, 47c, 47d provided in the cooked rice conveyance unit 6; and pulverizing equipment 25a, 25b, 25c, 25d, 25e provided in the pulverizing unit 7, the pulverizing equipment 25a, 25b, 25c, 25d, 25e serving as a plurality of pulverizing equipment 25 arranged in parallel.

Raw-material rice is inputted to the rice input hopper 12 in the rice storage unit 2, then is conveyed by the rice input elevator 13, and then is received by the rice input room 14. A predetermined amount of raw-material rice discharged from the rice input room 14 is sent to the rice washing machine 16 of the rice washing unit 3 by the raw-material rice conveyor 15. Washed rice obtained by the rice washing machine 16 is sent to the soaking tank 18 of the soaking unit 4 through a rice feeder 41 and the washed rice transport pipe 17, and then is soaked in the soaking tank 18.

Soaked rice in the soaking tank 18 is supplied to the conveyance upstream end side of a dewater conveyor 42. The dewater conveyor 42 includes a mesh belt and the like. The soaked rice is dewatered while being conveyed by the dewater conveyor 42, and is supplied to the continuous rice cooking apparatus 43. The continuous rice cooking apparatus 43, which for example does not use the cooking pot A (see FIG. 1, etc.), heats the soaked rice with steam and hot water while conveying the soaked rice with a conveyor (not shown), for continuously cooking the soaked rice. The continuous rice cooking apparatus 43 then discharges cooked rice R (see FIG. 9 and FIG. 10) with a cooked rice discharge conveyor 44. The cooked rice R discharged from the cooked rice discharge conveyor 44 has a temperature of 95° C. or more.

The cooked rice R discharged from the cooked rice discharge conveyor 44 of the continuous rice cooking apparatus 43 is conveyed to the pulverizing unit 7 through a conveyor 45, the main conveyor 46, and the input conveyors 47a, 47b, 47c, 47d of the cooked rice conveyance unit 6. The cooked rice conveyance unit 6 distributes and supplies the cooked rice R taken over from the continuous rice cooking apparatus 43 to the plurality of pulverizing equipment 25a, 25b, 25c, 25d, 25e of the pulverizing unit 7. The cooked rice R supplied to the pulverizing equipment 25a, 25b, 25c, 25d, 25e has a temperature of 85° C. or more.

Figure 7:
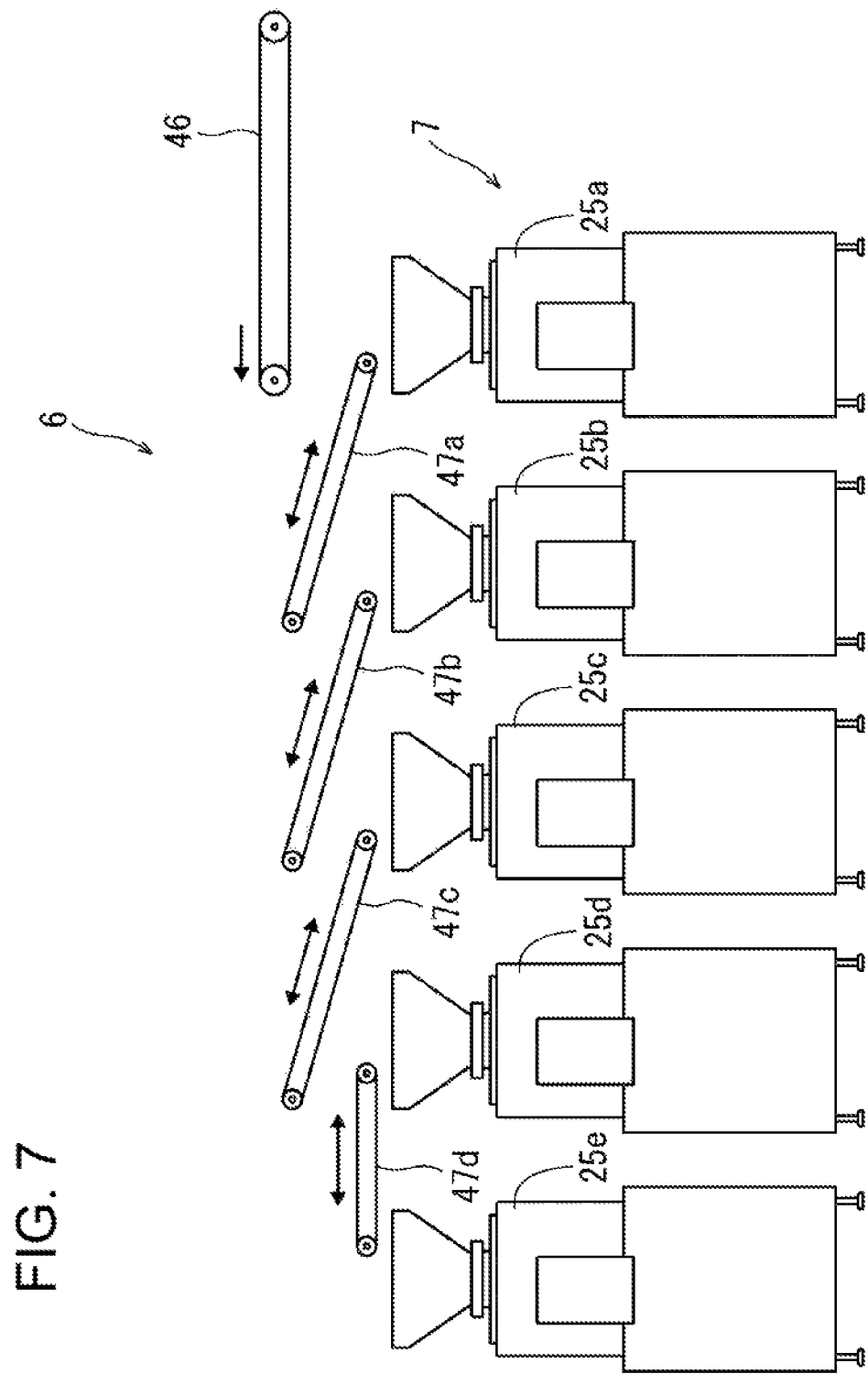
FIG. 7 A diagram showing a schematic configuration of a cooked rice conveyance unit and therearound according to the embodiment.

As shown in FIG. 7, the cooked rice conveyance unit 6 includes the main conveyor 46 and the plurality of input conveyors 47a, 47b, 47c, 47d. The main conveyor 46 is coupled to the cooked rice discharge conveyor 44 of the continuous rice cooking apparatus 43 via the conveyor 45. The plurality of input conveyors 47a, 47b, 47c, 47d are coupled to the main conveyor 46, and are also coupled in series to one another. The first input conveyor 47a, the second input conveyor 47b, and the third input conveyor 47c are disposed while being inclined in the conveyance direction. The first input conveyor 47a serving as a first stage has its midway portion located below the conveyance downstream end of the main conveyor 46. The first pulverizing equipment 25a is disposed below one end (lower end) of the first input conveyor 47a, and a midway portion of the subsequent second input conveyor 47b is located below the other end (upper end) of the first input conveyor 47a. The second pulverizing equipment 25b is disposed below one end (lower end) of the second input conveyor 47b, and a midway portion of the subsequent third input conveyor 47c is located below the other end (upper end) of the second input conveyor 47b. The third pulverizing equipment 25c is disposed below one end (lower end) of the third input conveyor 47c, and a midway portion of the subsequent fourth input conveyor 47d is located below the other end (upper end) of the third input conveyor 47c. The fourth input conveyor 47d is disposed horizontally. The fourth pulverizing equipment 25d is disposed below one end of the fourth input conveyor 47d, and the fifth pulverizing equipment 25e is disposed below the other end of the fourth input conveyor 47d.

The cooked rice conveyance unit 6 switches the conveyance direction of the input conveyors 47a, 47b, 47c, 47d, to thereby supply the cooked rice R to any of the pulverizing equipment 25a, 25b, 25c, 25d, 25e or supply the cooked rice R to the subsequent input conveyors 47b, 47c, 47d. In this manner, the cooked rice conveyance unit 6 distributes and supplies the cooked rice R to the plurality of pulverizing equipment 25a, 25b, 25c, 25d, 25e. Here, pulverization throughputs of the respective pulverizing equipment 25a, 25b, 25c, 25d, 25e are the same. A distributing operation performed by the cooked rice conveyance unit 6 will be described later.

The pulverizing unit 7 causes the pulverizing equipment 25a, 25b, 25c, 25d, 25e to pulverize the cooked rice, to obtain rice gel. The rice gel obtained by the pulverizing equipment 25a, 25b, 25c, 25d, 25e is supplied to the transport pump 26 via a rice gel hopper 48 of the rice gel transport unit 8. The transport pump 26, the number of which is one, transports the rice gel to the packing machine 28 of the gel packaging unit 9 via the rice gel transport pipe 27. The packing machine 28 packages the rice gel in small quantities, to obtain rice gel packages P which are then conveyed to the inspection unit 10 by the conveyor 30. The rice gel packages P are then inspected by the foreign substance detector 31 and the weight inspector 32, and are then successively placed onto the moving carriage 33 of the dispatch unit 11. Further, the rice gel packages P are heat-sterilized and cooled by the sterilizer 34, are subjected to water removal by the water remover 35, and are then packed in a box, so that the rice gel packages P are ready for dispatch.

Figure 8:
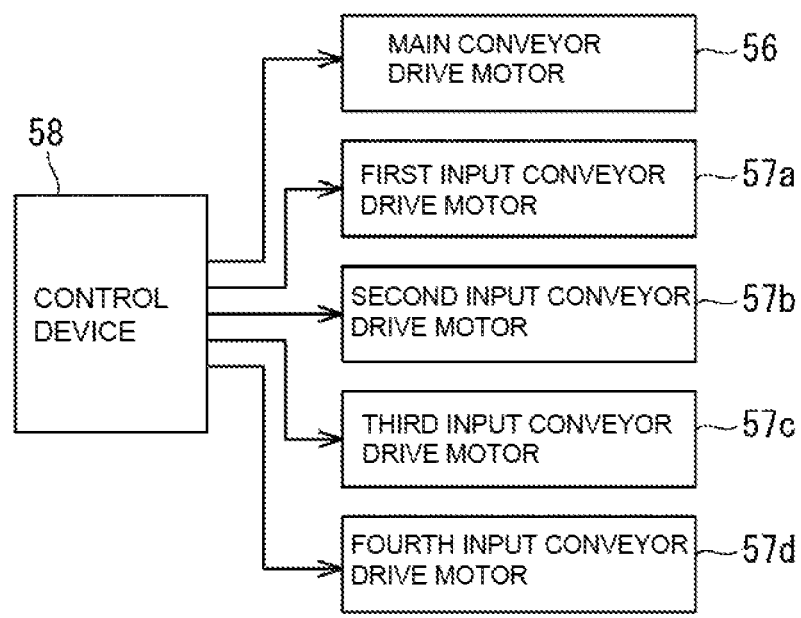
FIG. 8 A diagram showing a schematic configuration of a control system of the cooked rice conveyance unit.

As shown in FIG. 8, the rice gel production system 1 is provided with a control device 58 that controls operations of conveyor drive motors 56, 57a, 57b, 57c, 57d for the conveyors 46, 47a, 47b, 47c, 47d included in the cooked rice conveyance unit 6. The control device 58 controls a conveyance speed of the main conveyor 46, and conveyance directions and conveyance speeds of the input conveyors 47a, 47b, 47c, 47d.

One example of the distributing operation that the cooked rice conveyance unit 6 performs for distributing the cooked rice R will now be described with reference to FIG. 9. In this example of the distributing operation, steps (1) to (4) are repeated, and thereby the cooked rice R is distributed and supplied to the plurality of pulverizing equipment 25a, 25b, 25c, 25d, 25e. The steps (1) to (4) in the following description correspond respectively to the figures in parentheses (1) to (4) on FIG. 9. The cooked rice R discharged from the continuous rice cooking apparatus 43 is conveyed to the first input conveyor 47a via the conveyor 45 (see FIG. 7) and the main conveyor 46.

Figure 9:
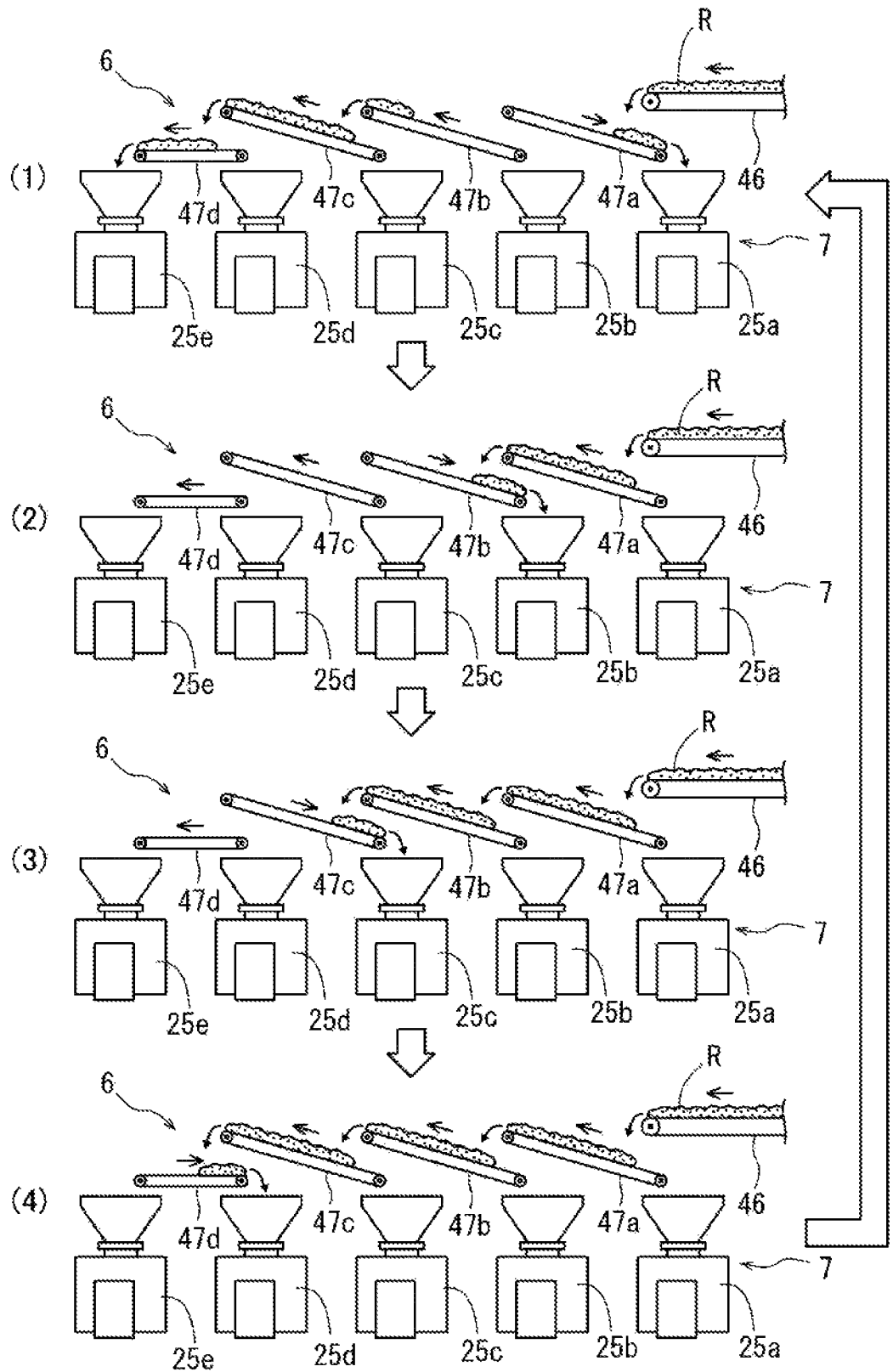
FIG. 9 A diagram for explanation of one exemplary operation of the cooked rice conveyance unit.

Step (1): referring to FIG. 9(1), to supply the cooked rice R to the first pulverizing equipment 25a, the conveyance direction of the first input conveyor 47a is controlled toward the first pulverizing equipment 25a, and the cooked rice R coming from the main conveyor 46 is supplied by a predetermined amount to the first pulverizing equipment 25a. In the step (1), moreover, the cooked rice R conveyed toward the fifth pulverizing equipment 25e which will be described later is conveyed on the input conveyors 47b, 47c, 47d, and the cooked rice R is supplied by a predetermined amount to the fifth pulverizing equipment 25e.

Step (2): referring to FIG. 9(2), to supply the cooked rice R to the second pulverizing equipment 25b, the conveyance direction of the first input conveyor 47a is switched from the direction under the operation state in the step (1) mentioned above to a direction toward the second input conveyor 47b. In addition, the conveyance direction of the second input conveyor 47b is controlled toward the second pulverizing equipment 25b. The cooked rice R coming from the main conveyor 46 is supplied by a predetermined amount to the second pulverizing equipment 25b via the input conveyors 47a, 47b.

Step (3): referring to FIG. 9(3), to supply the cooked rice R to the third pulverizing equipment 25c, the conveyance direction of the second input conveyor 47b is switched from the direction under the operation state in the step (2) mentioned above to a direction toward the third input conveyor 47c. In addition, the conveyance direction of the third input conveyor 47c is controlled toward the third pulverizing equipment 25c. The cooked rice R coming from the main conveyor 46 is supplied by a predetermined amount to the third pulverizing equipment 25c via the input conveyors 47a, 47b, 47c.

Step (4): referring to FIG. 9(4), to supply the cooked rice R to the fourth pulverizing equipment 25d, the conveyance direction of the third input conveyor 47c is switched from the direction under the operation state in the step (3) mentioned above to a direction toward the fourth input conveyor 47d. In addition, the conveyance direction of the fourth input conveyor 47d is controlled toward the fourth pulverizing equipment 25d. The cooked rice R coming from the main conveyor 46 is supplied by a predetermined amount to the fourth pulverizing equipment 25d via the input conveyors 47a, 47b, 47c, 47d.

After the cooked rice R is supplied by a predetermined amount to the fourth pulverizing equipment 25d in the step (4) mentioned above, the conveyance direction of the fourth input conveyor 47d is switched reversely and thereby controlled toward the fifth pulverizing equipment 25e. Then, a supply of the cooked rice R to the fifth pulverizing equipment 25e is started. If the sum of the amount of cooked rice R inputted to the fifth pulverizing equipment 25e and the amount of cooked rice R placed on the second to fourth input conveyors 47b, 47c, 47d reaches a predetermined amount, the conveyance direction of the first input conveyor 47a is switched reversely, so that an input of the cooked rice R to the first pulverizing equipment 25a is started (see the step (1) mentioned above, as well as FIG. 9(1)). The cooked rice R placed on the second to fourth input conveyors 47b, 47c, 47d is conveyed to the fifth pulverizing equipment 25e by driving of the input conveyors 47b, 47c, 47d. In this manner, the cooked rice R is supplied by a predetermined amount to the fifth pulverizing equipment 25e.

Repeating the steps (1) to (4) mentioned above allows the cooked rice R to be successively distributed and supplied to the pulverizing equipment 25a, 25b, 25c, 25d, 25e. A timing for switching the conveyance direction of each input conveyor 47a, 47b, 47c, 47d is determined by, for example, measuring how long the conveyor has been driven. Alternatively, it may be conceivable to: provide a measuring instrument for measuring the amount of cooked rice R passing through a predetermined position on the main conveyor 46; and based on an output from the measuring instrument, switch the conveyance direction of each input conveyor 47a, 47b, 47c, 47d so as to obtain a predetermined amount. Although the conveyance speed of each input conveyor 47a, 47b, 47c, 47d is preferably equal to or higher than the conveyance speed of the main conveyor 46, it may be acceptable that the conveyance speed of each input conveyor 47a, 47b, 47c, 47d is lower than the conveyance speed of the main conveyor 46. The order in which the cooked rice R is supplied to the pulverizing equipment 25a, 25b, 25c, 25d, 25e is not particularly limited.

Another example of the distributing operation that the cooked rice conveyance unit 6 performs for distributing the cooked rice R will now be described with reference to FIG. 10. In this example of the distributing operation, steps (1) to (3) are repeated, and thereby the cooked rice R is distributed and supplied to the plurality of pulverizing equipment 25a, 25b, 25c, 25d, 25e. The steps (1) to (3) in the following description correspond respectively to the figures in parentheses (1) to (3) on FIG. 10.

Figure 10:
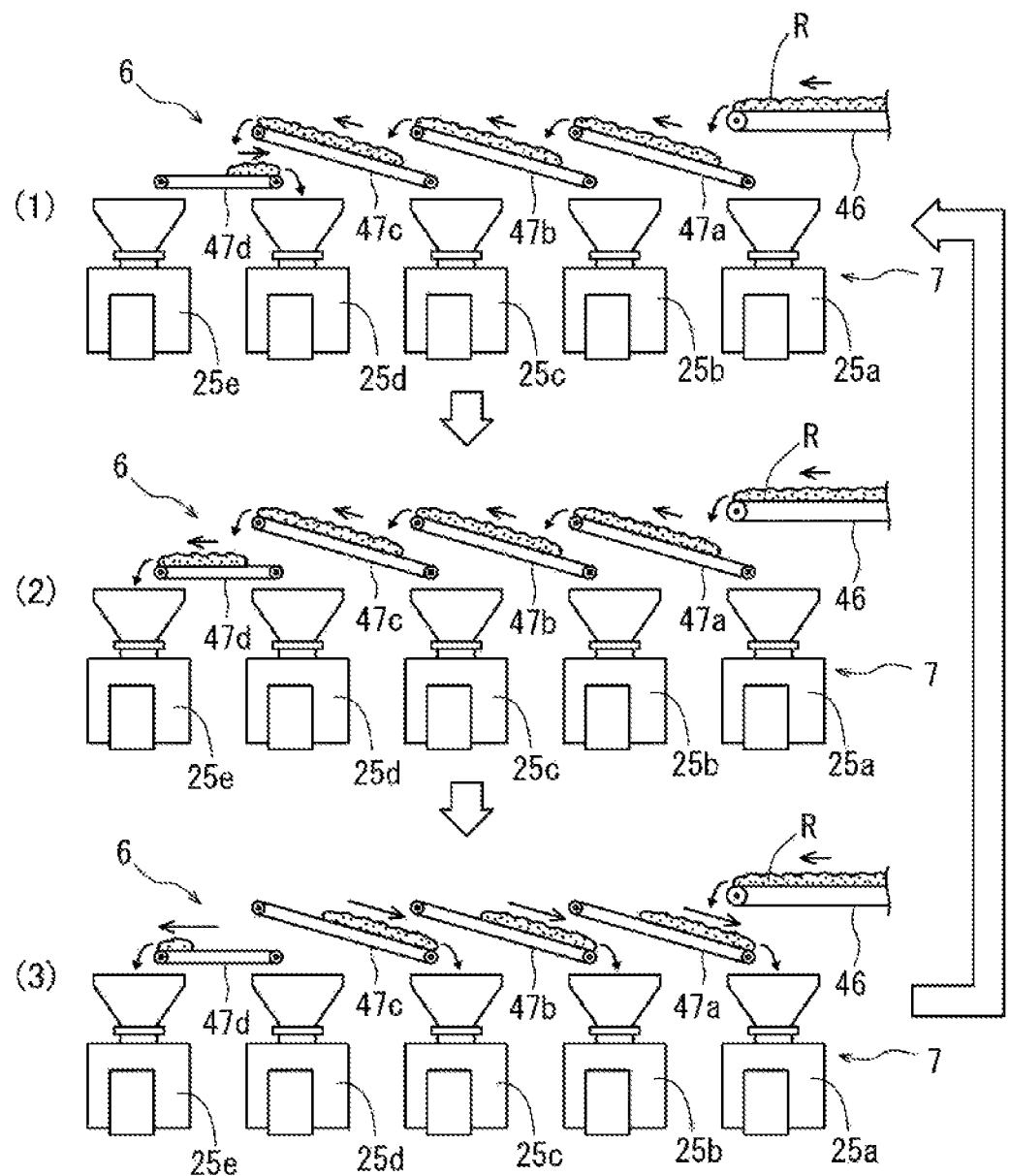
FIG. 10 A diagram for explanation of another exemplary operation of the cooked rice conveyance unit.

Step (1): referring to FIG. 10(1), driving of the input conveyors 47a, 47b, 47c, 47d is controlled so as to direct the conveyance direction of the first input conveyor 47a toward the second input conveyor 47b, the conveyance direction of the second input conveyor 47b toward the third input conveyor 47c, the conveyance direction of the third input conveyor 47c toward the fourth input conveyor 47d, and the conveyance direction of the fourth input conveyor 47d toward the fourth pulverizing equipment 25d. The lengths of the input conveyors 47a, 47b, 47c are almost equal, and the amounts of cooked rice R existing on the respective input conveyors 47a, 47b, 47c during conveyance of the cooked rice R are almost equal. The fourth input conveyor 47d is driven to supply the cooked rice R, the amount of which is almost equal to the amount of cooked rice R existing on each input conveyor 47a, 47b, 47c.

Step (2): referring to FIG. 10(2), the conveyance direction of the fourth input conveyor 47d is switched toward the fifth pulverizing equipment 25e, and a supply of the cooked rice R to the fifth pulverizing equipment 25e is started. The supply of the cooked rice R to the fifth pulverizing equipment 25e continues until the sum of the amount of cooked rice R inputted to the fifth pulverizing equipment 25e and the amount of cooked rice R existing on the fourth input conveyor 47d becomes almost equal to the amount of cooked rice R existing on each input conveyor 47a, 47b, 47c.

Step (3): if the sum of the amount of cooked rice R inputted to the fifth pulverizing equipment 25e and the amount of cooked rice R existing on the fourth input conveyor 47d becomes almost equal to the amount of cooked rice R existing on each input conveyor 47a, 47b, 47c, the conveyance directions of the input conveyors 47a, 47b, 47c are switched reversely as shown in FIG. 10(3), and the cooked rice R existing on the input conveyors 47a, 47b, 47c is supplied to the pulverizing equipment 25a, 25b, 25c, respectively. In order to make the cooked rice R less likely to fall from the main conveyor 46 during the supply of the cooked rice R to the pulverizing equipment 25a, the conveyance speed of the first input conveyor 47a is preferably higher than the conveyance speed of the main conveyor 46. Consequently, amounts of the cooked rice R supplied to the pulverizing equipment 25a, 25b, 25c, 25d, 25e in the steps (1) to (3) can be almost equal.

Repeating the steps (1) to (3) mentioned above allows the cooked rice R to be successively distributed and supplied to the pulverizing equipment 25a, 25b, 25c, 25d, 25e. Similarly to the embodiment described above with reference to FIG. 9, a timing for switching the conveyance direction of each input conveyor 47a, 47b, 47c, 47d may be determined by, for example, measuring how long the conveyor has been driven, or alternatively may be determined based on an output of a measuring instrument that measures the amount of cooked rice R passing through a predetermined position on the main conveyor 46.

In the steps (1) and (2) mentioned above, the conveyance speeds of the input conveyors 47a, 47b, 47c, 47d may be equal to, higher than, or lower than the conveyance speed of the main conveyor 46. The same is true for the conveyance speeds of the input conveyors 47b, 47c, 47d in the step (3) mentioned above.

In the rice gel production system 1 according to the embodiment described with reference to FIG. 5 to FIG. 10, the pulverizing unit 7 includes the pulverizing equipment 25a, 25b, 25c, 25d, 25e serving as the plurality of pulverizing equipment 25 arranged in parallel, and the cooked rice conveyance unit 6 distributes and supplies the cooked rice R taken over from the cooking unit 5 to the plurality of pulverizing equipment 25a, 25b, 25c, 25d, 25e. This configuration allows the cooked rice R coming from the cooking unit 5 to be pulverized concurrently in the plurality of pulverizing equipment 25a, 25b, 25c, 25d, 25e, to produce rice gel. This allows employment of a steam-type continuous cooker 43 (cooking unit 5) with a higher cooked rice production capacity, and thus enables a further increase in rice gel production capacity.

The cooked rice conveyance unit 6 further includes the main conveyor 46 and the plurality of input conveyors 47a, 47b, 47c, 47d. The main conveyor 46 is coupled to the cooking unit 5. The plurality of input conveyors 47a, 47b, 47c, 47d are coupled to the main conveyor 46 and are also coupled in series to one another. The first input conveyor 47a serving as a first stage has its midway portion located below the conveyance downstream end of the main conveyor 46. The pulverizing equipment 25a, 25b, 25c, 25d, 25e or midway portions of the subsequent input conveyors 47b, 47c, 47d are located below the opposite ends of the input conveyors 47a, 47b, 47c, 47d. Through switchover of the conveyance directions of the input conveyors 47a, 47b, 47c, 47d, the cooked rice R is supplied to the pulverizing equipment 25a, 25b, 25c, 25d, 25e or to the subsequent input conveyors 47b, 47c, 47d, so that the cooked rice R is distributed and supplied to the plurality of pulverizing equipment 25a, 25b, 25c, 25d, 25e. Thus, it is possible to distribute and supply the cooked rice R to the plurality of pulverizing equipment 25a, 25b, 25c, 25d, 25e with a simple configuration.

Since the cooking unit 5 includes the continuous rice cooking apparatus 43 that steams soaked rice (raw-material rice) while conveying the soaked rice with a conveyor, an increase in the production capacity for the cooked rice R can be obtained and thus a further increase in the rice gel production capacity can be obtained as compared with, for example, the continuous-type rice cooking machine 21 (see FIG. 1, etc.) that cooks rice in the plurality of cooking pots A being conveyed by a conveyor.

A rice gel production system according to yet another embodiment will now be described with reference to FIG. 11 and FIG. 12. A rice gel production system of this embodiment includes: a continuous rice cooking apparatus 43 provided in the cooking unit 5; a plurality of input conveyors 61 provided in the cooked rice conveyance unit 6; and a plurality of pulverizing equipment 25 provided in the pulverizing unit 7, the plurality of pulverizing equipment 25 being arranged in parallel. The other configurations are identical to those of the rice gel production system 1 according to the embodiment described above with reference to FIG. 5 and the like.

In the rice gel production system of this embodiment, the plurality of input conveyors 61 arranged in parallel have their conveyance upstream end portions located below the conveyance downstream end of the cooked rice discharge conveyor 44 of the continuous rice cooking apparatus 43. In this embodiment, five input conveyors 61 are provided. A plurality of distributing members 62 are disposed between the conveyance downstream end of the cooked rice discharge conveyor 44 and the conveyance upstream end portions of the input conveyors 61. The distributing members 62 are configured to distribute the cooked rice R discharged from the cooked rice discharge conveyor 44 almost equally to the five input conveyors 61.

Each of the distributing members 62 has a plate-shaped protrusion that protrudes toward the cooked rice discharge conveyor 44. The distributing members 62 divide cooked rice R existing throughout the entire width of the cooked rice discharge conveyor 44 such that the cooked rice R can be placed onto the respective input conveyors 61 after falling from the conveyance downstream end of the cooked rice discharge conveyor 44. Each pulverizing equipment 25 is disposed below the conveyance downstream end of each input conveyor 61. In this embodiment, five pulverizing equipment 25 are arranged in parallel. Pulverization throughputs of the respective pulverizing equipment 25 are equal.

The cooked rice R obtained by cooking in the continuous rice cooking apparatus 43 is discharged from the conveyance downstream end of the cooked rice discharge conveyor 44, and then fall toward the input conveyors 61. The cooked rice R being discharged has a temperature of about 95° C. The cooked rice R having fallen from the conveyance downstream end of the cooked rice discharge conveyor 44 is divided by the distributing members 62 which are disposed between adjacent ones of the input conveyors 61, and is then distributed and supplied to the respective input conveyors 61.

The cooked rice R supplied to the input conveyors 61 is conveyed by the respective input conveyors 61, and is supplied to the corresponding pulverizing equipment 25. At a time of being supplied to the pulverizing equipment 25, the cooked rice R has a temperature (herein, about 85° C.) higher than its temperature at a time of deteriorating. Each pulverizing equipment 25 pulverizes the cooked rice R into rice gel, and supplies the rice gel to the rice gel hopper 48. The rice gel supplied to the rice gel hopper 48 is, by the transport pump 26, transported to the gel packaging unit 9 (see FIG. 5, etc.) via the rice gel transport pipe 27.

In the rice gel production system of this embodiment, the pulverizing unit 7 includes the five (plurality of) pulverizing equipment 25 arranged in parallel, and the cooked rice conveyance unit 6 which take overs the cooked rice R from the cooking unit 5 distributes and supplies the cooked rice R to the five pulverizing equipment 25. This configuration allows the cooked rice R coming from the cooking unit 5 to be pulverized concurrently in the five pulverizing equipment 25, to produce rice gel. This allows employment of a steam-type continuous cooker 43 (cooking unit 5) with a higher cooked rice production capacity, and thus enables a further increase in rice gel production capacity.

In the rice gel production system of this embodiment, moreover, the cooked rice conveyance unit 6 includes the five (plurality of) input conveyors 61 which are arranged in parallel and which are coupled to the cooking unit 5; the pulverizing unit 7 includes the plurality of pulverizing equipment 25; and each of the pulverizing equipment 25 is disposed below the conveyance downstream end of each of the input conveyors 61. Thus, it is possible to distribute and supply the cooked rice R to the plurality of pulverizing equipment 25 with a simple configuration, and it is also possible to produce rice gel concurrently in the plurality of pulverizing equipment 25.

In the embodiment described above, the cooked rice R discharged from the continuous rice cooking apparatus 43 is conveyed with a conveyor. Alternatively, the cooked rice R may be transported by a single eccentric screw pump (mohno pump), for example. In such a configuration, the single eccentric screw pump transports the cooked rice R toward the plurality of pulverizing equipment 25 via a transport pipe that includes, in its midway portion, a switching valve and branched transport pipes, such that the switching valve is switched to thereby distribute and supply the cooked rice R to the plurality of pulverizing equipment 25. The transport pipe is constituted by, for example, a stainless steel pipe, for reduction or minimization of a temperature drop of the cooked rice during transportation of the cooked rice. Consequently, the cooked rice having a temperature (e.g., 85° C. or more) higher than a temperature at which the cooked rice deteriorates is supplied to each pulverizing equipment 25, for reduction or minimization of an increase in load on the pulverizing equipment 25, which may otherwise be caused by deterioration of the cooked rice.

The pulverizing unit 7 including a plurality of pulverizing equipment 25 may be configured to use a plurality of transport pumps 26 to transport rice gel produced by the pulverizing equipment 25 to the gel packaging unit 9. A transport system for transporting rice gel in the transport unit 8 is not limited to the transport pump 26 constituted by a single eccentric screw pump. It is just required that the transport system be able to transport rice gel. For example, a volute pump or the like may be used. How the transport unit 8 transports rice gel is not limited to the one using a pump. It is just required that the transport unit 8 be able to transport rice gel from the pulverizing unit 7 to the gel packaging unit 9. For example, the transport unit 8 may use a conveyance device such as a conveyor to transport rice gel from the pulverizing unit 7 to the gel packaging unit 9.

A rice gel production system according to a further embodiment will now be described with reference to FIG. 13. A rice gel production system of this embodiment includes: a continuous rice cooking apparatus 43 provided in the cooking unit 5; conveyors 45, 71, 72a, 72b, 72c, 72d, 72e, distributing members 73a, 73b, 73c, 73d, and a control device 74 provided in the cooked rice conveyance unit 6; and a plurality of pulverizing equipment 25a, 25b, 25c, 25d, 25e provided in the pulverizing unit 7. The other configurations are identical to those of the rice gel production system 1 according to the embodiment described above with reference to FIG. 5 and the like.

In the rice gel production system of this embodiment, the conveyor 45 is disposed below the conveyance downstream end of the cooked rice discharge conveyor 44 of the continuous rice cooking apparatus 43. The conveyor 45 takes over cooked rice from the cooked rice discharge conveyor 44. The conveyor 45 has its conveyance downstream end coupled to a conveyance upstream portion of the main conveyor 71. The main conveyor 71 has a conveyance midway portion on a lateral side of which the upstream ends of the first to fourth input conveyors 72a, 72b, 72c, 72d with respect to the conveyance direction are disposed. The main conveyor 71 has its conveyance downstream end coupled to a conveyance upstream portion of the fifth input conveyor 72e. The input conveyors 72a, 72b, 72c, 72d, 72e have the conveyance downstream ends, below which the first to fifth pulverizing equipment 25a, 25b, 25c, 25d, 25e of the pulverizing unit 7 are disposed, respectively.

The cooked rice conveyance unit 6 has first to fourth distributing members 73a, 73b, 73c, 73d that cause cooked rice conveyed on the main conveyor 71 to fall toward the first to fourth input conveyors 72a, 72b, 72c, 72d. Each of the distributing members 73a, 73b, 73c, 73d is movable from one to the other between a blocking position (indicated by the two-dot chain line) and a retracted position (indicated by the solid line). The blocking position is located in a conveyance path of cooked rice on the main conveyor 71. The retracted position is away from the conveyance path of cooked rice. A distributing member moving mechanism (not shown) whose operation is under control by the control device 74 operates so that the distributing members 73a, 73b, 73c, 73d move between the blocking position and the retracted position. When in the blocking positions, the distributing members 73a, 73b, 73c, 73d are inclined relative to the conveyance direction on the main conveyor 71.

Cooked rice obtained by cooking in the continuous rice cooking apparatus 43 is discharged from the conveyance downstream end of the cooked rice discharge conveyor 44, then fall onto the conveyor 45 of the cooked rice conveyance unit 6, and then is conveyed to the conveyance upstream portion of the main conveyor 71 by the conveyor 45. The main conveyor 71 takes over the cooked rice from the conveyor 45, and successively conveys the cooked rice toward the conveyance downstream side.

The cooked rice conveyance unit 6 causes the cooked rice conveyed by the main conveyor 71 to be distributed and supplied to the input conveyors 72a, 72b, 72c, 72d, 72e, and thus to be distributed and supplied to the pulverizing equipment 25a, 25b, 25c, 25d, 25e. To supply the cooked rice to the first input conveyor 72a, the first distributing member 73a is disposed at the blocking position on the main conveyor 71 under control by the control device 74. The cooked rice being conveyed on the main conveyor 71 comes into contact with the first distributing member 73a which is inclined relative to the conveyance direction, so that the cooked rice moves along the first distributing member 73a toward the first input conveyor 72a while being conveyed on the main conveyor 71, to fall onto a conveyance upstream portion of the first input conveyor 72a. The first input conveyor 72a takes over the cooked rice which is then supplied to the first pulverizing equipment 25a through operation of the first input conveyor 72a.

If the amount of cooked rice supplied to the first input conveyor 72a reaches a predetermined amount, the control device 74 moves the first distributing member 73a to the retracted position and has the second distributing member 73b disposed at the blocking position on the main conveyor 71. The cooked rice being conveyed on the main conveyor 71 reaches the second distributing member 73b, so that the cooked rice moves along the second distributing member 73b toward the second input conveyor 72b while being conveyed on the main conveyor 71, to fall onto a conveyance upstream portion of the second input conveyor 72b. The second input conveyor 72b takes over the cooked rice which is then supplied to the second pulverizing equipment 25b through operation of the second input conveyor 72b.

If the amount of cooked rice supplied to the second input conveyor 72b reaches a predetermined amount, the control device 74 moves the second distributing member 73b to the retracted position and has the third distributing member 73c disposed at the blocking position on the main conveyor 71. At this time, the first distributing member 73a is at the retracted position. The cooked rice being conveyed on the main conveyor 71 reaches the third distributing member 73c, so that the cooked rice moves along the third distributing member 73c toward the third input conveyor 72c while being conveyed on the main conveyor 71, to fall onto a conveyance upstream portion of the third input conveyor 72c. The third input conveyor 72c takes over the cooked rice which is then supplied to the third pulverizing equipment 25c through operation of the third input conveyor 72c.

If the amount of cooked rice supplied to the third input conveyor 72c reaches a predetermined amount, the control device 74 moves the third distributing member 73c to the retracted position and has the fourth distributing member 73d disposed at the blocking position on the main conveyor 71. At this time, the first and second distributing members 73a, 73b are at the retracted positions. The cooked rice being conveyed on the main conveyor 71 reaches the fourth distributing member 73d, so that the cooked rice moves along the fourth distributing member 73d toward the fourth input conveyor 72d while being conveyed on the main conveyor 71, to fall onto a conveyance upstream portion of the fourth input conveyor 72d. The fourth input conveyor 72d takes over the cooked rice which is then supplied to the fourth pulverizing equipment 25d through operation of the fourth input conveyor 72d.

If the amount of cooked rice supplied to the fourth input conveyor 72d reaches a predetermined amount, the control device 74 moves the fourth distributing member 73d to the retracted position, to have the first to fourth distributing members 73a, 73b, 73c, 73d disposed at the retracted positions. The cooked rice being conveyed on the main conveyor 71 falls from the conveyance downstream end of the main conveyor 71, onto the conveyance upstream portion of the fifth input conveyor 72e. The fifth input conveyor 72e takes over the cooked rice which is then supplied to the fifth pulverizing equipment 25e through operation of the fifth input conveyor 72e. If the sum of the amount of cooked rice supplied to the fifth input conveyor 72e and the amount of cooked rice existing downstream of the blocking position of the first distributing member 73a on the main conveyor 71 reaches a predetermined amount, the control device 74 has the first distributing member 73a disposed at the blocking position to start supplying cooked rice to the first input conveyor 72a.

A timing for moving each of the distributing members 73a, 73b, 73c, 73d is determined by, for example, measuring how long the main conveyor 71 has been driven. Alternatively, it may be conceivable to: provide a measuring instrument for measuring the amount of cooked rice passing through the upstream side of the main conveyor 71 with respect to the conveyance direction; and based on an output from the measuring instrument, control a timing at which each of the distributing members 73a, 73b, 73c, 73d is to be moved.

In this manner, the cooked rice conveyance unit 6 distributes and supplies the cooked rice to the pulverizing equipment 25a, 25b, 25c, 25d, 25e of the pulverizing unit 7. At a time of being supplied to the pulverizing equipment 25a, 25b, 25c, 25d, 25e, the cooked rice has a temperature (herein, about 85° C.) higher than its temperature at a time of deteriorating.

In the rice gel production system of this embodiment, the cooked rice conveyance unit 6 includes the main conveyor 71, the five (plurality of) input conveyors 72a, 72b, 72c, 72d, 72e, and a distributing mechanism (the distributing members 73a, 73b, 73c, 73d) for distributing cooked rice conveyed on the main conveyor 71 to the input conveyors 72a, 72b, 72c, 72d, 72e; and the pulverizing unit 7 includes the five (plurality of) pulverizing equipment 25a, 25b, 25c, 25d, 25e which are coupled to the conveyance downstream ends of the respective input conveyors 72a, 72b, 72c, 72d, 72e. Thus, it is possible to distribute and supply cooked rice to the plurality of pulverizing equipment 25 with a simple configuration, and it is also possible to produce rice gel concurrently in the plurality of pulverizing equipment 25a, 25b, 25c, 25d, 25e, which leads to an increase in rice gel production capacity.

In the cooked rice conveyance unit 6 of this embodiment, the order in which cooked rice is distributed and supplied to the input conveyors 72a, 72b, 72c, 72d, 72e is not particularly limited. The configuration of the distributing mechanism in the cooked rice conveyance unit 6 shown in FIG. 13 is merely one example. The moving direction and arrangement of the distributing members 73a, 73b, 73c, 73d are not particularly limited. For example, the distributing members 73a, 73b, 73c, 73d may be configured to be movable in the up-down direction so that they can move between the blocking positions and the retracted positions above the main conveyor 71. Alternatively, the distributing members 73a, 73b, 73c, 73d may be configured to be rotatable in a horizontal direction so that they can move between the blocking positions which are on the main conveyor 71 and the retracted positions which are away from the main conveyor 71.

Figure 11:
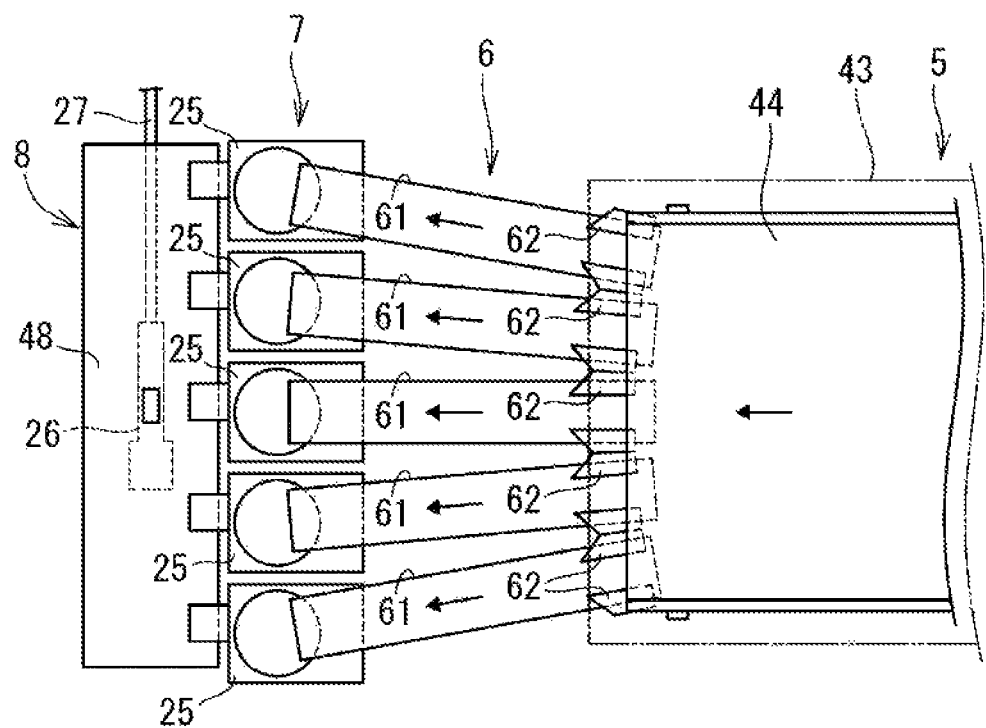
FIG. 11 A schematic plan view showing a cooked rice conveyance unit and therearound of a rice gel production system according to yet another embodiment.
Figure 12:
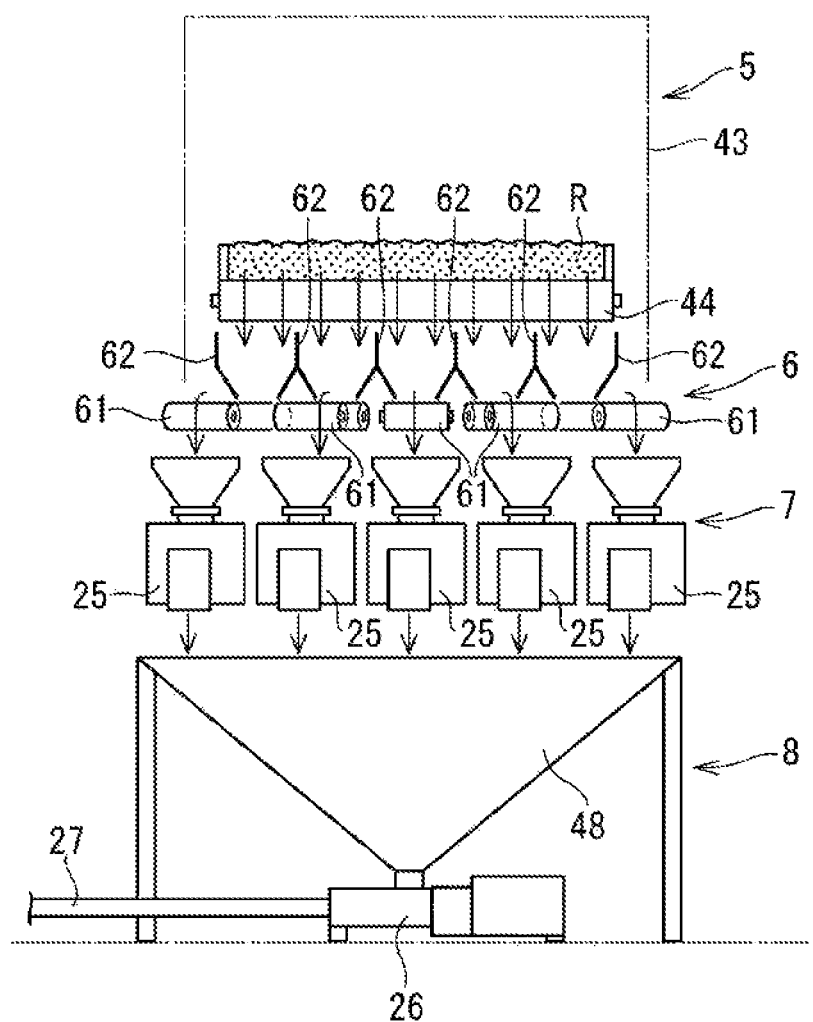
FIG. 12 A diagram showing a schematic configuration of the cooked rice conveyance unit and therearound according to the embodiment.
Figure 13:
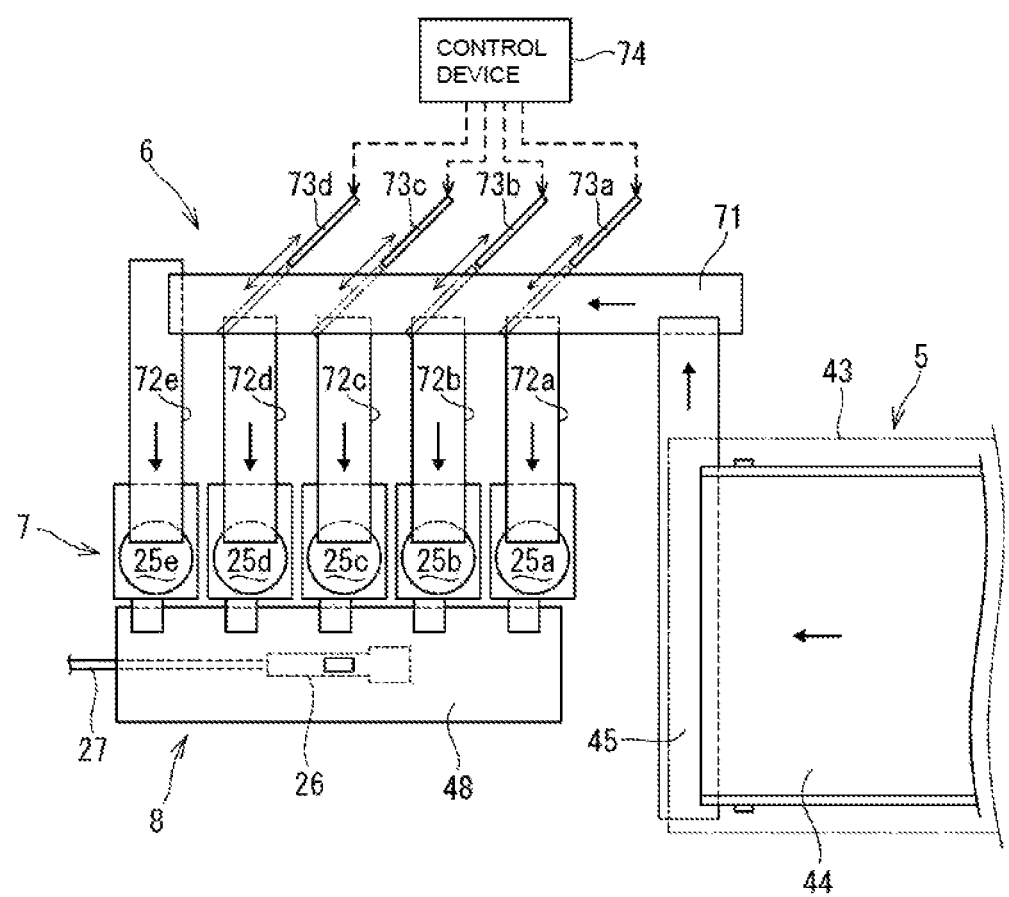
FIG. 13 A schematic plan view showing a cooked rice conveyance unit and therearound of a rice gel production system according to a further embodiment.

How the cooked rice conveyance unit 6 distributes cooked rice to the plurality of pulverizing equipment 25 included in the pulverizing unit 7 is not limited to the configuration shown in FIG. 7, the configuration shown in FIG. 11 and FIG. 12, or the configuration shown in FIG. 13. Any configuration may be employed as long as the configuration is able to take over cooked rice from the cooking unit 5 and distribute and supply the cooked rice to the plurality of pulverizing equipment 25. The number of input conveyors and the number of pulverizing equipment arranged in parallel are not limited to the ones exemplified in the embodiment described above, but can be modified as appropriate in accordance with the cooked rice production capacity of the cooking unit 5 or the pulverization throughput of the pulverizing equipment 25 included in the pulverizing unit 7.

A configuration including the cooking unit 5 that performs continuous cooking by using the plurality of cooking pots A may include: the plurality of pulverizing equipment 25; and the cooked rice conveyance unit 6 that distributes and supplies cooked rice taken out from the cooking pots A to the plurality of pulverizing equipment 25. For example, instead of the pulverizing equipment 25, the main conveyor 46 (see FIG. 5 to FIG. 10) may be disposed below the loosening machine 24 (see FIG. 1 and FIG. 2) that loosens cooked rice taken out from the cooking pots A, and cooked rice to be supplied from the cooking pots A via the loosening machine 24 may be distributed and supplied to the plurality of pulverizing equipment 25a, 25b, 25c, 25d, 25e by the plurality of input conveyors 47a, 47b, 47c, 47d. Here, the number of input conveyors and the number of pulverizing equipment may be reduced in accordance with the amount of cooked rice contained in the cooking pots A.

Figure 14:
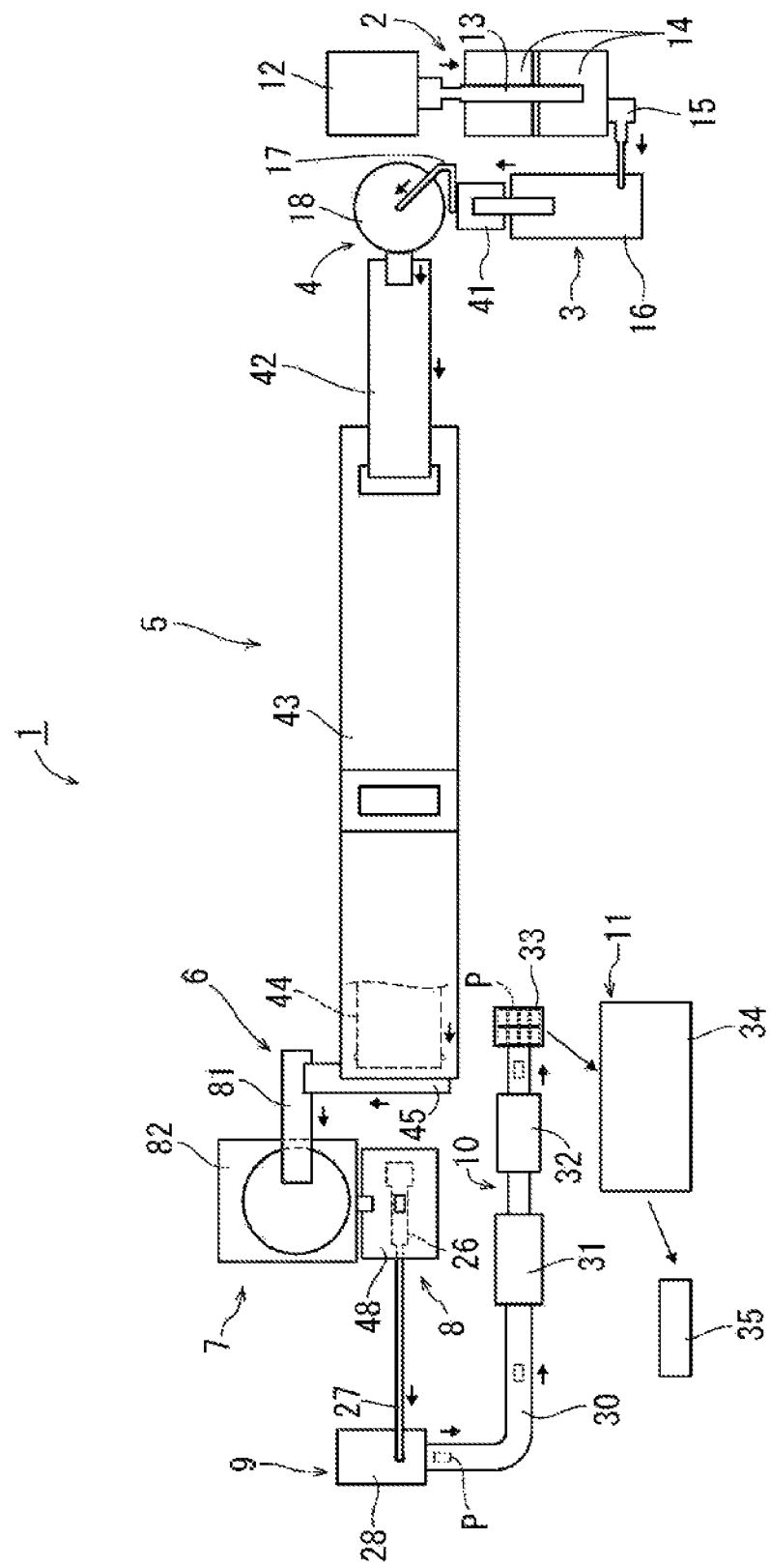
FIG. 14 A schematic plan view showing a rice gel production system according to a still further embodiment.
Figure 15:
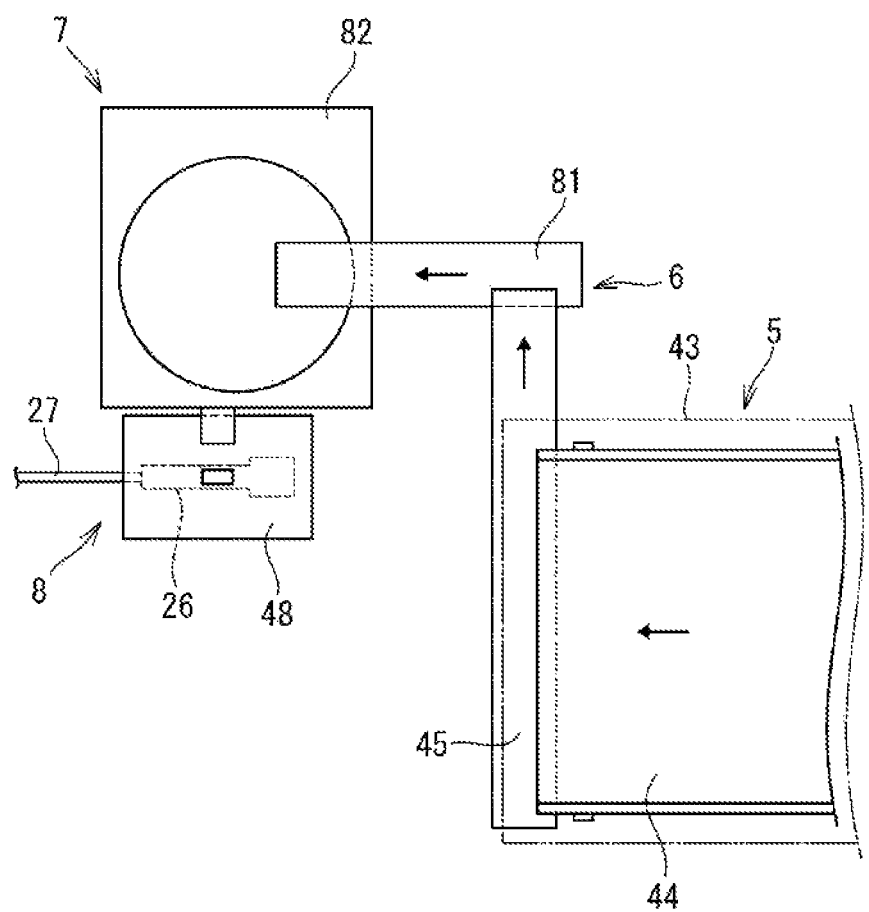
FIG. 15 A schematic plan view showing on an enlarged scale a cooked rice conveyance unit and therearound according to the embodiment.

A rice gel production system according to a still further embodiment will now be described with reference to FIG. 14 and FIG. 15. A rice gel production system 1 of this embodiment includes: a continuous rice cooking apparatus 43 provided in the cooking unit 5; a conveyor 45 and an input conveyor 81 provided in the cooked rice conveyance unit 6; and one pulverizing equipment 82 provided in the pulverizing unit 7. The other configurations are identical to those of the rice gel production system 1 according to the embodiment described above with reference to FIG. 5 and the like.

In the rice gel production system 1 of this embodiment, the conveyor 45 is disposed below the conveyance downstream end of the cooked rice discharge conveyor 44 of the continuous rice cooking apparatus 43. The conveyor 45 takes over cooked rice from the cooked rice discharge conveyor 44. The conveyor 45 has its conveyance downstream end coupled to a conveyance upstream portion of the input conveyor 81. The cooked rice conveyance unit 6 takes over cooked rice discharged from the continuous rice cooking apparatus 43 of the cooking unit 5, and conveys the cooked rice to the pulverizing equipment 82, which is large-sized, through operation of the conveyors 45, 81.

The pulverizing equipment 82 is one having a high pulverization processing speed (pulverization capacity), and is able to exert a pulverization processing speed that allows cooked rice discharged from the continuous rice cooking apparatus 43 to be pulverized without stagnation, to produce rice gel. In other words, the amount of cooked rice that can be pulverized by the pulverizing equipment 82 per unit time is larger than the amount of cooked rice that is discharged from the cooking unit 5 (continuous rice cooking apparatus 43) per unit time. Rice gel obtained by the pulverizing equipment 82 is supplied to the transport pump 26 via the rice gel hopper 48 of the rice gel transport unit 8, and then the transport pump 26 transports the rice gel to the gel packaging unit 9 via the rice gel transport pipe 27.

In the rice gel production system 1 of this embodiment, as described above, the pulverizing unit 7 pulverizes cooked rice by using one pulverizing equipment 82, to obtain rice gel. As compared with a pulverizing unit 7 including a plurality of pulverizing equipment, the configurations of the cooked rice conveyance unit 6 and the pulverizing unit 7 can be made simple, and moreover installation spaces therefor can be made small. This embodiment may further simplify the configuration of the cooked rice conveyance unit 6, if the pulverizing equipment 82 is disposed below the conveyance downstream end of the conveyor 45 with omission of the input conveyor 81.

Although some embodiments have been described above, the present invention is not limited to the embodiments described above, but can be embodied in various aspects. The configurations of components in the present invention are not limited to those of the illustrated embodiments, and can be variously changed or modified without departing from the gist of the invention.

For example, the embodiments described above have the cooking unit 5 including the continuous-type rice cooking machine 21 or the continuous rice cooking apparatus 43. In this respect, however, the rice gel production system 1 is just required to have a cooking unit 5 that is able to obtain cooked rice by cooking or steaming raw-material rice. For example, the cooking unit 5 may be a continuous-type rice steamer that steams soaked rice (raw-material rice) while conveying the soaked rice with a conveyor to obtain steamed rice.

Raw-material rice that is used in the rice gel production systems of the embodiments may be so-called waste rice including broken rice, cracked rice, and the like. Using waste rice which is inexpensive as the raw-material rice can reduce production costs for rice gel. In the rice gel production systems of the embodiments, cooked rice obtained by cooking raw-material rice is not dispatched as it is, but is pulverized into rice gel by the pulverizing unit, and therefore using waste rice as the raw-material rice causes no problem.

In the embodiments described above, the pulverizing equipment 25 has a two-stage configuration made up of the first pulverizing unit 100A serving as a preceding unit and the second pulverizing unit 100B serving as a subsequent unit. Here, still another or other pulverizing unit(s) may be arranged in series to these preceding and subsequent pulverizing units, to have a configuration with three or more stages.

In the embodiments described above, the first pulverizing unit 100A serving as the preceding unit and the second pulverizing unit 100B serving as the subsequent unit, which are included in the pulverizing equipment 25, are constituted by millstone-type friction grinding apparatuses, respectively. In this respect, however, they may be constituted by any other type of pulverizers instead of friction grinding apparatuses.

The first pulverizing unit 100A serving as the preceding unit may be alternatively constituted by a silent cutter for pulverizing the cooked rice. In the silent cutter, an annular container having an annular recess in which a pulverization object is contained is rotated about its central axis, and at the same time, a cutter is rotated within the annular recess about an axis extending along an annular circumferential direction. Employing the silent cutter which is relatively inexpensive as the first pulverizing unit can make the cost of equipment lower. In addition, the silent cutter employed as the first pulverizing unit can stably pulverize a relatively large amount of cooked rice while successively cutting the cooked rice.

INDUSTRIAL APPLICABILITY

The present invention is applicable to a rice gel production system and a rice gel production method for producing rice gel in the form of gel.

REFERENCE SIGNS LIST 1 rice gel production system
4 soaking unit
5 cooking unit
6 cooked rice conveyance unit
7 pulverizing unit
8 rice gel transport unit
9 gel packaging unit
21 continuous-type rice cooking machine
25 pulverizing equipment (pulverizing unit)
25a first pulverizing equipment (pulverizing unit)
25b second pulverizing equipment (pulverizing unit)
25c third pulverizing equipment (pulverizing unit)
25d fourth pulverizing equipment (pulverizing unit)
25e fifth pulverizing equipment (pulverizing unit)
26 transport pump (single eccentric screw pump)
38 raw-material rice processing unit
43 steam-type continuous rice cooking machine
46 main conveyor
47a first input conveyor
47b second input conveyor
47c third input conveyor
47d fourth input conveyor
82 pulverizing equipment
100A first pulverizing unit
100B second pulverizing unit
R cooked rice
Ra first pulverized rice
RG rice gel

The invention claimed is:

1. A rice gel production system for producing rice gel in a form of a gel, the rice gel production system comprising:
   a cooking unit configured to cook or steam raw-material rice to make cooked rice;
   a cooked rice conveyance unit configured to convey the cooked rice from the cooking unit to a pulverizing unit; and
   the pulverizing unit configured to receive the cooked rice and pulverize the cooked rice to make rice gel,
   the pulverizing unit including:
      a first pulverizing unit configured to pulverize the cooked rice to make first pulverized rice, and
      a second pulverizing unit including an upper mill part and a lower mill part, the second pulverizing unit configured to pulverize the first pulverized rice discharged from the first pulverizing unit by causing the first pulverized rice to pass through a gap between the upper mill part and the lower mill part to make the rice gel, the pulverization of the second pulverizing unit being performed more finely as compared with pulverization performed by the first pulverizing unit.

2. The rice gel production system according to claim 1, further comprising a first pulverized rice conveyor configured to convey the first pulverized rice discharged from the first pulverizing unit to the second pulverizing unit.

3. The rice gel production system according to claim 1, wherein:
   the second pulverizing unit is constituted by a millstone-type friction grinding apparatus that includes the upper mill part and the lower mill part; and
   the upper mill part is stationary and the lower mill part is configured to rotate relative to the upper mill part.

4. The rice gel production system according to claim 3, wherein:
   the first pulverizing unit is constituted by a millstone-type friction grinding apparatus that includes an upper mill part and a lower mill part and is configured to pulverize the cooked rice by causing the pulverization object to pass through a gap between the upper and lower mill parts rotating relative to each other, and
   a gap width in the second pulverizing unit is set smaller than a gap width in the first pulverizing unit, the gap width in the second pulverizing unit being a width of the gap between the upper and lower mill parts.

5. A rice gel production method for producing rice gel in a form of a gel, the method comprising:
   pulverizing cooked rice made by cooking or steaming raw-material rice to make rice gel in the form of a gel,
   wherein pulverizing the cooked rice includes:
      grinding the cooked rice to make first pulverized rice; and
      grinding the first pulverized rice to make the rice gel, the grinding of the first pulverized rice being performed more finely as compared with grinding of the cooked rice.

6. A rice gel production system for producing rice gel in a form of a gel, the rice gel production system comprising:
   a cooking unit configured to cook or steam a raw-material rice to make cooked rice;
   a cooked rice conveyance unit configured to convey the cooked rice from the cooking unit to a pulverizing unit; and
   the pulverizing unit configured to receive the cooked rice and grind the cooked rice to make the rice gel, wherein the pulverizing unit includes a plurality of pulverizing machines.

7. The rice gel production system according to claim 6, wherein:
at a time of being supplied to the pulverizing unit, the cooked rice has a temperature higher than a temperature associated with a time at which an alpha-form of a gelatinized starch component deteriorates to a beta-form.

8. The rice gel production system according to claim 6, wherein:
the cooked rice conveyance unit is configured to receive the cooked rice from the cooking unit and supply the cooked rice to the plurality of pulverizing machines.

9. The rice gel production system according to claim 8, wherein:
the cooked rice conveyance unit includes a main conveyor and a plurality of input conveyors, the main conveyor is configured to be coupled to the cooking unit,
one of the input conveyors is configured to be coupled to the main conveyor, and
the plurality of input conveyors are configured to be in series with one another, and
one of the input conveyors serving as a first stage has a midway portion thereof located below a conveyance downstream end of the main conveyor, and one of the pulverizing machines or another one of the input conveyors serving as a subsequent stage is located below an end of the one input conveyor, and
the input conveyors are configured to switch between forward and reverse directions such that the cooked rice is distributed and supplied to the plurality of pulverizing machines.

10. The rice gel production system according to, claim 6, wherein:
the cooking unit is constituted by a continuous-type rice cooking machine configured to heat a plurality of cooking pots,
a conveyor is configured to convey the plurality of cooking pots in which the raw-material rice and cooking water are contained to make the cooked rice, and
the cooked rice conveyance unit is further configured to cause removal of the cooked rice from the cooking pots prior to conveyance of the cooked rice to the pulverizing unit.

11. The rice gel production system according to claim 6, wherein:
the cooking unit is constituted by a continuous rice cooking apparatus configured to steam a raw-material rice while conveying the raw-material rice by a conveyor.

12. The rice gel production system according to claim 6, further comprising:
a rice gel transport unit configured to transport the rice gel made by the pulverizing unit; and
a gel packaging unit configured to package the rice gel.

13. The rice gel production system according to claim 12, wherein
the rice gel transport unit is configured to transport the rice gel by a single eccentric screw pump.

14. The rice gel production system according to claim 1, wherein one of the upper mill part or the lower mill part is configured to be stationary and the other of the upper mill part or the lower mill part is configured to rotate relative to the one of the upper mill part or the lower mill part.

15. The rice gel production system according to claim 6, wherein the plurality of pulverizing machines includes a first grinding mill.

16. The rice gel production system according to claim 15, wherein the first grinding mill includes an upper mill plate and a lower mill plate that is configured to rotate relative to the upper mill plate to grind cooked rice to make first pulverized rice.

17. The rice gel production system according to claim 16, wherein the plurality of pulverizing machines includes a second grinding mill.

18. The rice gel production system according to claim 17, wherein the second grinding mill includes an upper mill plate and a lower mill plate that is configured to rotate relative to the upper mill plate to grind the first pulverized rice to make rice gel.

19. The rice gel production system according to claim 18, wherein a first gap defined by the upper mill plate and the lower mill plate of the first grinding mill is larger than a second gap defined by the upper mill plate and the lower mill plate of the second grinding mill.

* * * * *